US011956685B2

(12) United States Patent
Anderson et al.

(10) Patent No.: US 11,956,685 B2
(45) Date of Patent: Apr. 9, 2024

(54) SON FUNCTION FOR DYNAMICALLY CONFIGURED RU IN MULTI-PROTOCOL RAN

(71) Applicant: Cisco Technology, Inc., San Jose, CA (US)

(72) Inventors: Fred J. Anderson, Lakeville, OH (US); Shailender Potharaju, Fremont, CA (US); Indermeet Singh Gandhi, San Jose, CA (US); Clark Carty, Brunswick, OH (US)

(73) Assignee: Cisco Technology, Inc., San Jose, CA (US)

( * ) Notice: Subject to any disclaimer, the term of this patent is extended or adjusted under 35 U.S.C. 154(b) by 258 days.

(21) Appl. No.: 17/529,170

(22) Filed: Nov. 17, 2021

(65) Prior Publication Data

US 2023/0156548 A1 May 18, 2023

(51) Int. Cl.
*H04W 36/14* (2009.01)
*H04W 8/24* (2009.01)
*H04W 16/14* (2009.01)
*H04W 88/10* (2009.01)

(52) U.S. Cl.
CPC .......... *H04W 36/14* (2013.01); *H04W 8/24* (2013.01); *H04W 16/14* (2013.01); *H04W 88/10* (2013.01)

(58) Field of Classification Search
CPC ....... H04W 88/10; H04W 16/14; H04W 8/24; H04W 36/14
See application file for complete search history.

(56) References Cited

U.S. PATENT DOCUMENTS

| | | | |
|---|---|---|---|
| 2007/0099613 A1* | 5/2007 | Burgan | H04M 3/42246 455/435.2 |
| 2011/0305220 A1* | 12/2011 | Lindoff | H04W 28/26 370/329 |
| 2015/0372874 A1 | 12/2015 | Nuss et al. | |
| 2016/0021571 A1 | 1/2016 | Bansal | |

(Continued)

FOREIGN PATENT DOCUMENTS

CN 110868457 3/2020

OTHER PUBLICATIONS

International Search Report and Written Opinion for PCT application No. PCT/US2022/079821, dated Feb. 10, 2023, 13 pages.

(Continued)

*Primary Examiner* — Dai Phuong
(74) *Attorney, Agent, or Firm* — Polsinelli P.C.

(57) ABSTRACT

System, methods, and computer-readable media for switching a dynamic radio of a single RU between Radio Access Technology (RAT) protocols based on a Software-Defined RAN intelligent controller (SD-RIC). The SD-RIC efficiently assigning RAN resources by converting a radio access point to either 5G or Wi-Fi based on the load conditions and the number of users seen on the network, so that it appropriately servers the customer and end devices. To determine the load conditions may be based on active users on a particular cell, and then the resource utilization cue is a connection latency. A single radio unit includes a primary radio and a secondary radio, each being independently tuned. The primary radio is static while a secondary one can be influenced based on the conditions, turning into N-RU or Wi-Fi.

17 Claims, 12 Drawing Sheets

(56) References Cited

U.S. PATENT DOCUMENTS

| | | | |
|---|---|---|---|
| 2016/0134470 A1* | 5/2016 | Cregg | H04W 12/50 |
| | | | 709/223 |
| 2016/0234876 A1* | 8/2016 | Burra | H04W 36/14 |
| 2019/0246394 A1 | 8/2019 | Asplund et al. | |
| 2020/0045673 A1 | 2/2020 | Chou et al. | |
| 2020/0178084 A1 | 6/2020 | Kumar | |
| 2020/0280827 A1* | 9/2020 | Fechtel | H04W 4/40 |
| 2021/0028988 A1* | 1/2021 | Jana | H04W 24/02 |

OTHER PUBLICATIONS

Anonymous Etsi: "Reconfigurable Radio Systems (RRS); Cognitive Radio System Concept," ETSI TR 102 802 V1.1.1, Feb. 1, 2010, XXP055829004, 31 pages.

* cited by examiner

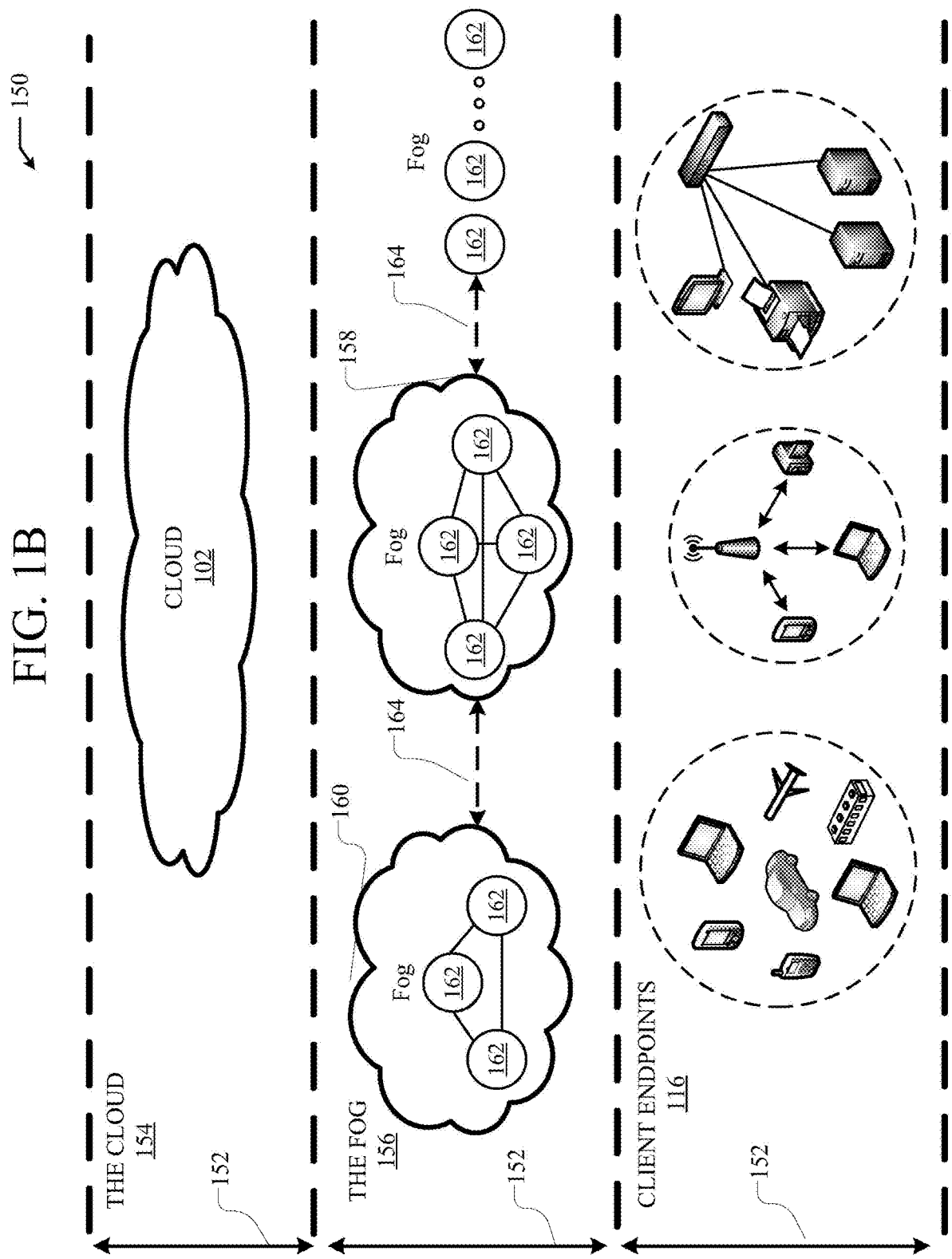

SON FUNCTION FOR DYNAMICALLY CONFIGURED RU IN MULTI-PROTOCOL RAN

TECHNICAL FIELD

The present disclosure relates generally to configuring a radio unit having configurable personalities (RU-configurable) to different radio services, and more specifically to configuring between 5G and Wi-Fi.

BACKGROUND

Fifth-generation (5G) mobile and wireless networks will provide enhanced mobile broadband communications and are intended to deliver a wider range of services and applications as compared to all prior generation mobile and wireless networks. Compared to prior generations of mobile and wireless networks, the 5G architecture is service-based, meaning that wherever suitable, architecture elements are defined as network functions that offer their services to other network functions via common framework interfaces.

Advances in SDR (software-defined radio) have enabled RU-configurable personalities that may be tailored to different radio services. For example, in 5G, RU may utilize New Radio (NR) and New Radio Unlicensed (NR-U) in various functional splits. Also, Wi-Fi Access Points (APs) and Various IoT protocols may also be embodied separately or simultaneously. Multi-protocol RUs may provide network operators an opportunity to assign extreme-edge Radio Access Network (RAN) resources to the changing connection and capacity requirements of the user base.

As such RUs have had software-upgradeable feature sets and compatibilities with the base standard, but the RAN Intelligent Controller (MC) that serves as a cloud native, and a central component of an open and virtualized RAN network has been developed to only serve a single protocol.

BRIEF DESCRIPTION OF THE DRAWINGS

In order to describe the manner in which the above-recited and other advantages and features of the disclosure can be obtained, a more particular description of the principles briefly described above will be rendered by reference to specific embodiments thereof which are illustrated in the appended drawings. Understanding that these drawings depict only exemplary embodiments of the disclosure and are not therefore to be considered to be limiting of its scope, the principles herein are described and explained with additional specificity and detail through the use of the accompanying drawings in which:

FIG. 1B illustrates an example fog computing architecture;

DETAILED DESCRIPTION

Figure 1A:
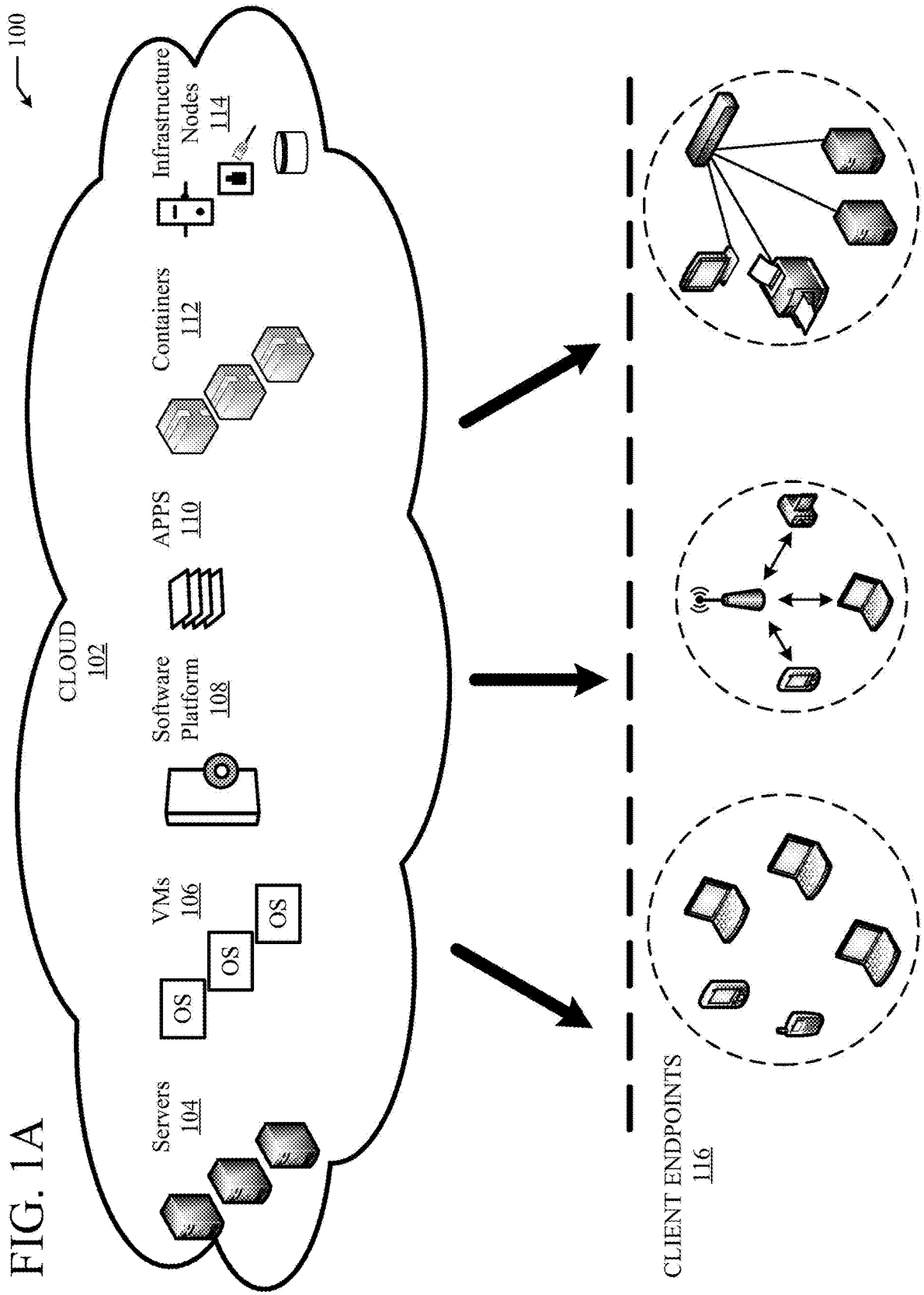
FIG. 1A illustrates an example cloud computing architecture.

The detailed description set forth below is intended as a description of various configurations of embodiments and is not intended to represent the only configurations in which the subject matter of this disclosure can be practiced. The appended drawings are incorporated herein and constitute a part of the detailed description. The detailed description includes specific details for the purpose of providing a more thorough understanding of the subject matter of this disclosure. However, it will be clear and apparent that the subject matter of this disclosure is not limited to the specific details set forth herein and may be practiced without these details. In some instances, structures and components are shown in block diagram form to avoid obscuring the concepts of the subject matter of this disclosure.

Overview

Disclosed are systems, apparatuses, methods, non-transitory computer-readable media, and circuits for switching a dynamic radio on a single RU between Radio Access Technologies (RAT) protocols. According to at least one example, a method may include receiving a report of conditions of client capabilities and network conditions of a static radio of a first radio unit (RU) and a dynamic radio of the first RU. In some examples, the static radio may be configured at boot-up and retain a network interface and the dynamic radio is reconfigurable to provide dynamic network service access across a plurality of different RATS.

In some examples, the method may include determining that network service access needs of a User Equipment (UE) require that the dynamic radio protocol switch from a first RAT to a second RAT of the plurality of different RATs based on the report of conditions of client capabilities and network conditions. The method may further include sending instructions to the first RU to switch the dynamic radio protocol to the second RAT.

A system can include one or more processors and at least one computer-readable storage medium storing instructions which, when executed by the one or more processors, cause the one or more processors to receive a report of conditions of client capabilities and network conditions of a static radio of a first radio unit (RU) and a dynamic radio of the first RU. In some examples, the static radio may be configured at boot-up and retain a network interface and the dynamic radio is reconfigurable to provide dynamic network service access across a plurality of different RATS.

The instructions may further cause the one or more processors to determine that network service access needs of a User Equipment (UE) require that the dynamic radio protocol switch from a first RAT to a second RAT of the plurality of different RATs based on the report of conditions of client capabilities and network conditions. The instructions may further cause the one or more processors to send instructions to the first RU to switch the dynamic radio protocol to the second RAT.

A non-transitory computer-readable storage medium having stored therein instructions which, when executed by a computing system, cause the computing system to receive a report of conditions of client capabilities and network conditions of a static radio of a first radio unit (RU) and a dynamic radio of the first RU. In some examples, the static radio may be configured at boot-up and retain a network interface and the dynamic radio is reconfigurable to provide dynamic network service access across a plurality of different RATS.

The instructions may further cause the computing system to determine that network service access needs of a User Equipment (UE) require that the dynamic radio protocol switch from a first RAT to a second RAT of the plurality of different RATs based on the report of conditions of client capabilities and network conditions. The instructions may further cause the computing system to send instructions to the first RU to switch the dynamic radio protocol to the second RAT.

DESCRIPTION OF EXAMPLE EMBODIMENTS

As noted above, fifth-generation (5G) mobile and wireless networks will provide enhanced mobile broadband communications and are intended to deliver a wider range of services and applications as compared to all prior generation mobile and wireless networks. Compared to prior generations of mobile and wireless networks, the 5G architecture is service-based, meaning that wherever suitable, architecture elements are defined as network functions that offer their services to other network functions via common framework interfaces.

Advances in SDR (software-defined radio) have enabled radio unit to have configurable (RU-configurable) personalities that may be tailored to different radio services. For example, in 5G, a RU may utilize New Radio (NR) and New Radio Unlicensed (NR-U) in various functional splits. Also, Wi-Fi Access Points (APs) and Various IoT protocols may also be embodied separately or simultaneously. Multi-protocol RUs may provide network operators an opportunity to assign extreme-edge Radio Access Network (RAN) resources to the changing connection and capacity requirements of the user base.

The disclosed technology addresses the need in the art for a SON function that extends typical management of 5G RAN Remote Radio Head (RRH) and/or RU resources to other access protocols, such as those in the IEEE 802.11 family of protocols, e.g. Wi-Fi. From an infrastructure standpoint, a more flexible and adaptive mechanism to tune the radio to a particular technology is needed. In addition, once the radio is operating on one technology, 5G or Wi-Fi, more flexible and adaptive decisions need to be taken into account, and with respect to what parameters to attributes from an environment or load perspective.

RUs have software-upgradeable feature sets and compatibilities with the base standard. Having a RU capability for dynamic reconfigurability to distinct protocols/services is a new enablement. A RAN intelligent controller (MC) may be an element of open RAN architecture that controls and optimizes other RAN elements and resources. Based on the deployment use case, a multi-protocol SD-RIC may configure a static radio to either in 5G or Wi-Fi. It is possible that the user may setup two overlapping networks of both 5G and Wi-Fi, if a mix of users need to be supported from Day0. Assuming on the multi-protocol SDR is initially provisioned for 5G use cases, both the static and the dynamic radios may be brought up as 5G Cells. In such a case, the static radio may stay on a shared or license spectrum for reliability needs while the secondary radio may be open to operate on wide variety of spectrums, depending up on the availability of shared spectrum and NR-U.

The present technology involves system, methods, and computer-readable media for switching a dynamic radio on a single RU between RAT protocols. The intelligence is built around the new logical entity, a Software-Defined RAN intelligent controller (SD-RIC). This adaptive approach greatly improves assigning RAN resources by converting a radio access point to either 5G or Wi-Fi based on the load conditions and the number of users seen on the network, so that it appropriately servers the customer and end devices. To determine the load conditions may be based on active users on the particular cell, and then the resource utilization cue is a connection latency.

With the solution being having multiple radios in a radio unit and each radio can be independently tuned, one of the radios can be a static radio, which is not changed while a secondary one can be influenced based on the conditions, turning into N-RU or Wi-Fi, for example. Based on whether it's acting as a Wi-Fi or 5G, it can be connected to a WLC in case it's Wi-F or a 5G packet core if it's a 5G radio. Also, a sub 6 GHz can be a spine of the anchor, which is static and the other link could be either a sub 6 GHz or could be millimeter wave.

Figure 2:
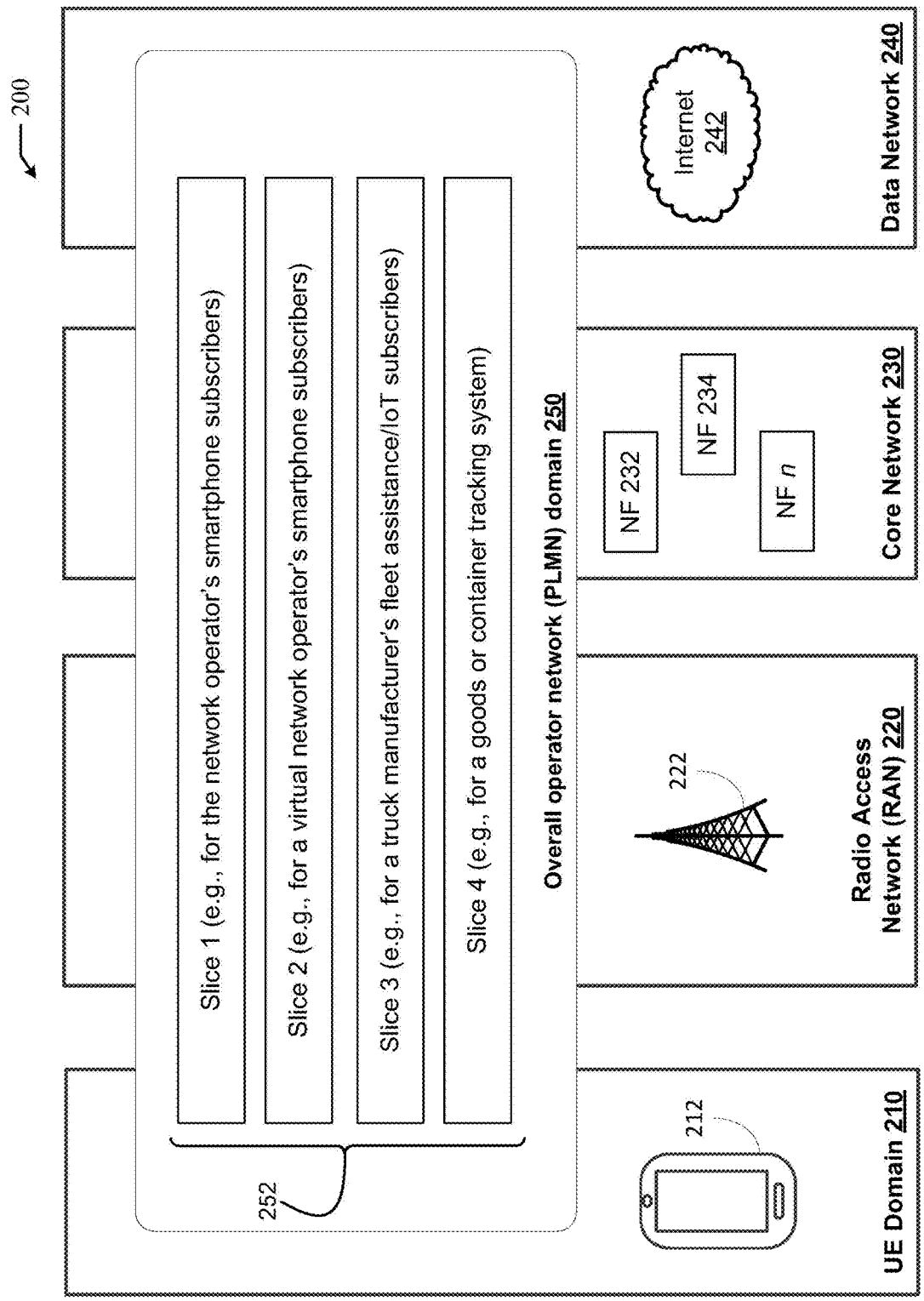
FIG. 2 depicts an example schematic representation of a 5G network environment in which network slicing has been implemented, and in which one or more aspects of the present disclosure may operate.

A description of network environments and architectures for network data access and services, as illustrated in FIGS. 1A, 1B, and 2 is first disclosed herein. A discussion of systems, methods, and computer-readable media for switching a dynamic radio on a single RU between RAT protocols, as shown in FIGS. 3-6, will then follow. The discussion then concludes with a brief description of an example device, as illustrated in FIG. 7. These variations shall be described herein as the various embodiments are set forth. The disclosure now turns to FIG. 1A.

FIG. 1A illustrates a diagram of an example cloud computing architecture 100. The architecture can include a cloud 102. The cloud 102 can be used to form part of a TCP connection or otherwise be accessed through the TCP connection. Specifically, the cloud 102 can include an initiator or a receiver of a TCP connection and be utilized by the initiator or the receiver to transmit and/or receive data through the TCP connection. The cloud 102 can include one or more private clouds, public clouds, and/or hybrid clouds. Moreover, the cloud 102 can include cloud elements 104-114. The cloud elements 104-114 can include, for example, servers 104, virtual machines (VMs) 106, one or more software platforms 108, applications or services 110, software containers 112, and infrastructure nodes 114. The infrastructure nodes 114 can include various types of nodes, such as compute nodes, storage nodes, network nodes, management systems, etc.

The cloud 102 can be used to provide various cloud computing services via the cloud elements 104-114, such as SaaSs (e.g., collaboration services, email services, enterprise resource planning services, content services, communication services, etc.), infrastructure as a service (IaaS) (e.g., security services, networking services, systems management services, etc.), platform as a service (PaaS) (e.g., web services, streaming services, application development services, etc.), and other types of services such as desktop as a service (DaaS), information technology management as a service (ITaaS), managed software as a service (MSaaS), mobile backend as a service (MBaaS), etc.

The client endpoints 116 can connect with the cloud 102 to obtain one or more specific services from the cloud 102. The client endpoints 116 can communicate with elements 104-114 via one or more public networks (e.g., Internet), private networks, and/or hybrid networks (e.g., virtual private network). The client endpoints 116 can include any device with networking capabilities, such as a laptop computer, a tablet computer, a server, a desktop computer, a smartphone, a network device (e.g., an access point, a router, a switch, etc.), a smart television, a smart car, a sensor, a GPS device, a game system, a smart wearable object (e.g., smartwatch, etc.), a consumer object (e.g., Internet refrigerator, smart lighting system, etc.), a city or transportation system (e.g., traffic control, toll collection system, etc.), an internet of things (IoT) device, a camera, a network printer, a transportation system (e.g., airplane, train, motorcycle, boat, etc.), or any smart or connected object (e.g., smart home, smart building, smart retail, smart glasses, etc.), and so forth.

FIG. 1B illustrates a diagram of an example fog computing architecture 150. The fog computing architecture can be used to form part of a TCP connection or otherwise be accessed through the TCP connection. Specifically, the fog computing architecture can include an initiator or a receiver of a TCP connection and be utilized by the initiator or the receiver to transmit and/or receive data through the TCP connection. The fog computing architecture 150 can include the cloud layer 154, which includes the cloud 102 and any other cloud system or environment, and the fog layer 156, which includes fog nodes 162. The client endpoints 116 can communicate with the cloud layer 154 and/or the fog layer 156. The architecture 150 can include one or more communication links 152 between the cloud layer 154, the fog layer 156, and the client endpoints 116. Communications can flow up to the cloud layer 154 and/or down to the client endpoints 116.

The fog layer 156 or "the fog" provides the computation, storage and networking capabilities of traditional cloud networks, but closer to the endpoints. The fog can thus extend the cloud 102 to be closer to the client endpoints 116. The fog nodes 162 can be the physical implementation of fog networks. Moreover, the fog nodes 162 can provide local or regional services and/or connectivity to the client endpoints 116. As a result, traffic and/or data can be offloaded from the cloud 102 to the fog layer 156 (e.g., via fog nodes 162). The fog layer 156 can thus provide faster services and/or connectivity to the client endpoints 116, with lower latency, as well as other advantages such as security benefits from keeping the data inside the local or regional network(s).

The fog nodes 162 can include any networked computing devices, such as servers, switches, routers, controllers, cameras, access points, gateways, etc. Moreover, the fog nodes 162 can be deployed anywhere with a network connection, such as a factory floor, a power pole, alongside a railway track, in a vehicle, on an oil rig, in an airport, on an aircraft, in a shopping center, in a hospital, in a park, in a parking garage, in a library, etc.

In some configurations, one or more fog nodes 162 can be deployed within fog instances 158, 160. The fog instances 158, 158 can be local or regional clouds or networks. For example, the fog instances 156, 158 can be a regional cloud or data center, a local area network, a network of fog nodes 162, etc. In some configurations, one or more fog nodes 162 can be deployed within a network, or as standalone or individual nodes, for example. Moreover, one or more of the fog nodes 162 can be interconnected with each other via links 164 in various topologies, including star, ring, mesh or hierarchical arrangements, for example.

In some cases, one or more fog nodes 162 can be mobile fog nodes. The mobile fog nodes can move to different geographic locations, logical locations or networks, and/or fog instances while maintaining connectivity with the cloud layer 154 and/or the endpoints 116. For example, a particular fog node can be placed in a vehicle, such as an aircraft or train, which can travel from one geographic location and/or logical location to a different geographic location and/or logical location. In this example, the particular fog node may connect to a particular physical and/or logical connection point with the cloud 154 while located at the starting location and switch to a different physical and/or logical connection point with the cloud 154 while located at the destination location. The particular fog node can thus move within particular clouds and/or fog instances and, therefore, serve endpoints from different locations at different times.

FIG. 2 depicts an example schematic representation of a 5G network environment 200 in which network slicing has been implemented, and in which one or more aspects of the present disclosure may operate. As illustrated, network environment 200 is divided into four domains, each of which will be explained in greater depth below; a User Equipment (UE) domain 210, e.g. of one or more enterprise, in which a plurality of user cellphones or other connected devices 212 reside; a Radio Access Network (RAN) domain 220, in which a plurality of radio cells, base stations, towers, or other radio infrastructure 222 resides; a Core Network 230, in which a plurality of Network Functions (NFs) 232, 234, . . . , n reside; and a Data Network 240, in which one or more data communication networks such as the Internet 242 reside. Additionally, the Data Network 240 can support SaaS providers configured to provide SaaSs to enterprises, e.g. to users in the UE domain 210.

Core Network 230 contains a plurality of Network Functions (NFs), shown here as NF 232, NF 234 . . . NF n. In some embodiments, core network 230 is a 5G core network (5GC) in accordance with one or more accepted 5GC architectures or designs. In some embodiments, core network 230 is an Evolved Packet Core (EPC) network, which combines aspects of the 5GC with existing 4G networks. Regardless of the particular design of core network 230, the plurality of NFs typically execute in a control plane of core network 230, providing a service based architecture in which a given NF allows any other authorized NFs to access its services. For example, a Session Management Function (SMF) controls session establishment, modification, release, etc., and in the course of doing so, provides other NFs with access to these constituent SMF services.

In some embodiments, the plurality of NFs of core network 230 can include one or more Access and Mobility Management Functions (AMF; typically used when core network 230 is a 5GC network) and Mobility Management Entities (MME; typically used when core network 230 is an EPC network), collectively referred to herein as an AMF/MME for purposes of simplicity and clarity. In some embodiments, an AMF/MME can be common to or otherwise shared by multiple slices of the plurality of network slices 252, and in some embodiments an AMF/MME can be unique to a single one of the plurality of network slices 252.

The same is true of the remaining NFs of core network 230, which can be shared amongst one or more network slices or provided as a unique instance specific to a single one of the plurality of network slices 252. In addition to NFs comprising an AMF/MME as discussed above, the plurality of NFs of the core network 230 can additionally include one or more of the following: User Plane Functions (UPFs); Policy Control Functions (PCFs); Authentication Server Functions (AUSFs); Unified Data Management functions (UDMs); Application Functions (AFs); Network Exposure Functions (NEFs); NF Repository Functions (NRFs); and Network Slice Selection Functions (NSSFs). Various other NFs can be provided without departing from the scope of the present disclosure, as would be appreciated by one of ordinary skill in the art.

Across these four domains of the 5G network environment 200, an overall operator network domain 250 is defined. The operator network domain 250 is in some embodiments a Public Land Mobile Network (PLMN), and can be thought of as the carrier or business entity that provides cellular service to the end users in UE domain 210. Within the operator network domain 250, a plurality of network slices 252 are created, defined, or otherwise provisioned in order to deliver a desired set of defined features and functionalities, e.g. SaaSs, for a certain use case or corresponding to other requirements or specifications. Note that network slicing for the plurality of network slices 252 is implemented in end-to-end fashion, spanning multiple disparate technical and administrative domains, including management and orchestration planes (not shown). In other words, network slicing is performed from at least the enterprise or subscriber edge at UE domain 210, through the Radio Access Network (RAN) 120, through the 5G access edge and the 5G core network 230, and to the data network 240. Moreover, note that this network slicing may span multiple different 5G providers.

For example, as shown here, the plurality of network slices 252 include Slice 1, which corresponds to smartphone subscribers of the 5G provider who also operates network domain, and Slice 2, which corresponds to smartphone subscribers of a virtual 5G provider leasing capacity from the actual operator of network domain 250. Also shown is Slice 3, which can be provided for a fleet of connected vehicles, and Slice 4, which can be provided for an IoT goods or container tracking system across a factory network or supply chain. Note that these network slices 252 are provided for purposes of illustration, and in accordance with the present disclosure, and the operator network domain 250 can implement any number of network slices as needed, and can implement these network slices for purposes, use cases, or subsets of users and user equipment in addition to those listed above. Specifically, the operator network domain 250 can implement any number of network slices for provisioning SaaSs from SaaS providers to one or more enterprises.

5G mobile and wireless networks will provide enhanced mobile broadband communications and are intended to deliver a wider range of services and applications as compared to all prior generation mobile and wireless networks. Compared to prior generations of mobile and wireless networks, the 5G architecture is service based, meaning that wherever suitable, architecture elements are defined as network functions that offer their services to other network functions via common framework interfaces. In order to support this wide range of services and network functions across an ever-growing base of user equipment (UE), 5G networks incorporate the network slicing concept utilized in previous generation architectures.

Within the scope of the 5G mobile and wireless network architecture, a network slice comprises a set of defined features and functionalities that together form a complete Public Land Mobile Network (PLMN) for providing services to UEs. This network slicing permits for the controlled composition of a PLMN with the specific network functions and provided services that are required for a specific usage scenario. In other words, network slicing enables a 5G network operator to deploy multiple, independent PLMNs where each is customized by instantiating only those features, capabilities and services required to satisfy a given subset of the UEs or a related business customer needs.

In particular, network slicing is expected to play a critical role in 5G networks because of the multitude of use cases and new services 5G is capable of supporting. Network service provisioning through network slices is typically initiated when an enterprise requests network slices when registering with AMF/MME for a 5G network. At the time of registration, the enterprise will typically ask the AMF/MME for characteristics of network slices, such as slice bandwidth, slice latency, processing power, and slice resiliency associated with the network slices. These network slice characteristics can be used in ensuring that assigned network slices are capable of actually provisioning specific services, e.g. based on requirements of the services, to the enterprise.

Associating SaaSs and SaaS providers with network slices used to provide the SaaSs to enterprises can facilitate efficient management of SaaS provisioning to the enterprises. Specifically, it is desirable for an enterprise/subscriber to associate already procured SaaSs and SaaS providers with network slices actually being used to provision the SaaSs to the enterprise. However, associating SaaSs and SaaS providers with network slices is extremely difficult to achieve without federation across enterprises, network service providers, e.g. 5G service providers, and SaaS providers.

Figure 3A:
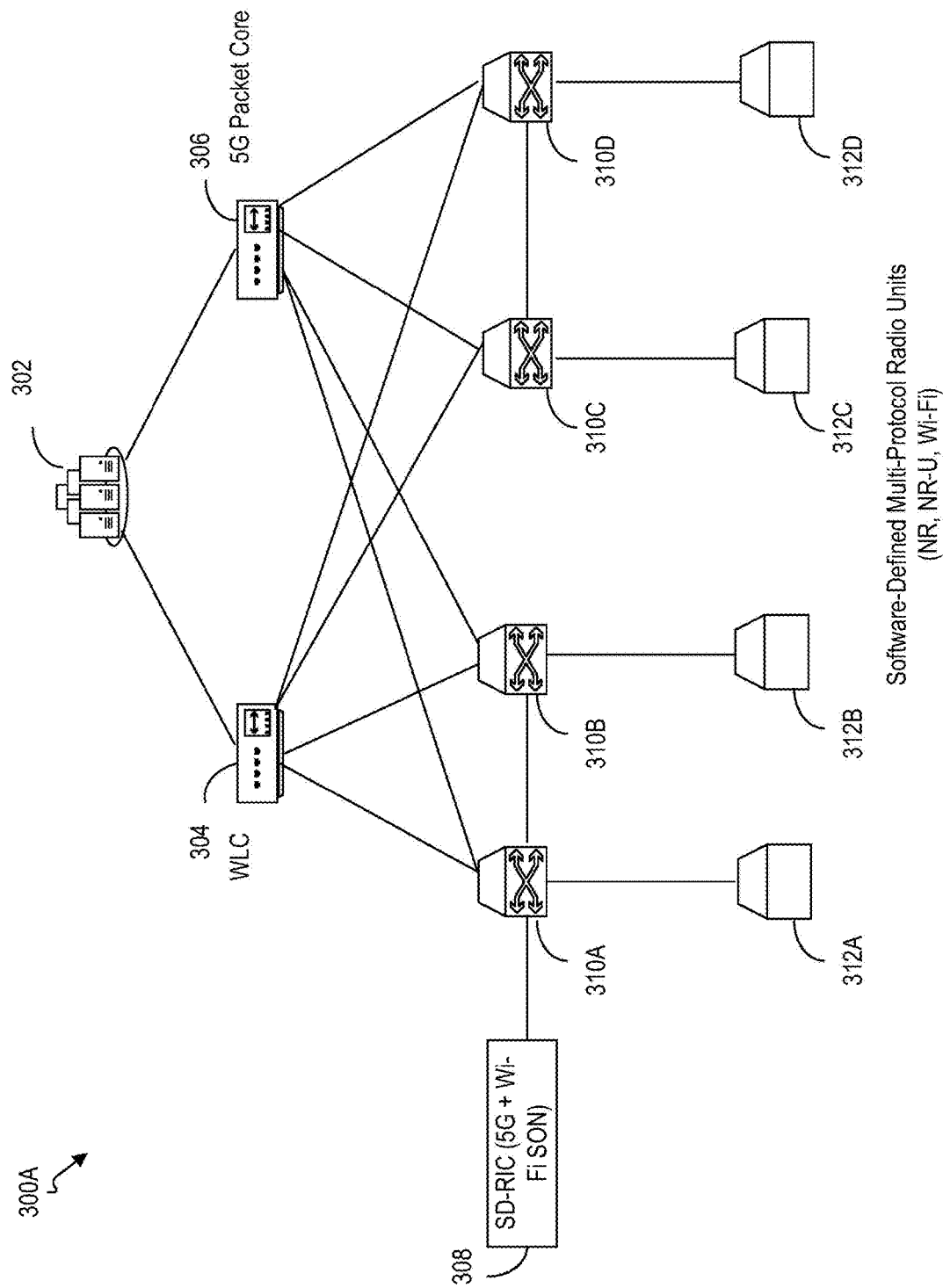
FIG. 3A illustrates an example schematic representation of a Central Unit (CU) of a 5G network environment wherein a Software-Defined RAN Intelligent Controller (SD-RIC) controls dynamic switching between Radio Access Technologies (RATs), according to an example of the instant disclosure.

FIG. 3A illustrates an example schematic representation of a Central Unit (CU) of a 5G network environment wherein a Software-Defined RAN Intelligent Controller (SD-RIC) 308 controls dynamic switching between RATs. The 5G network environment 300A may include a central network controller 302. The central network controller 302 may provide software-based network automation, rich contextual analytics, and network visualization of a network cloud. Further, the central network controller 302 may control and configure a wireless LAN controller (WLC) 304 and a 5G Packet Core 306. The WLC 304 and 5G Packet Core 306 may rely on switches 310 (e.g., 310A, 310B, 310C, 310D) for load balancing decisions on traffic coming from the network as well as switching between connections with the WLC 304 and the 5G Packet Core 306. The SD-RIC 304 may serve as a Self-Organized Network (SON) function that extends typical management of 5G RAN Remote Radio Head (RRH) and/or RU resources to other access protocols, such as Wi-Fi. The SD-RIC 304 may control the protocols implemented in the RUs 312 (e.g., 312A, 312B, 312C, 312D) via the switches 310. The RUs 312 may be software-defined multi-protocol RUs.

Figure 3B:
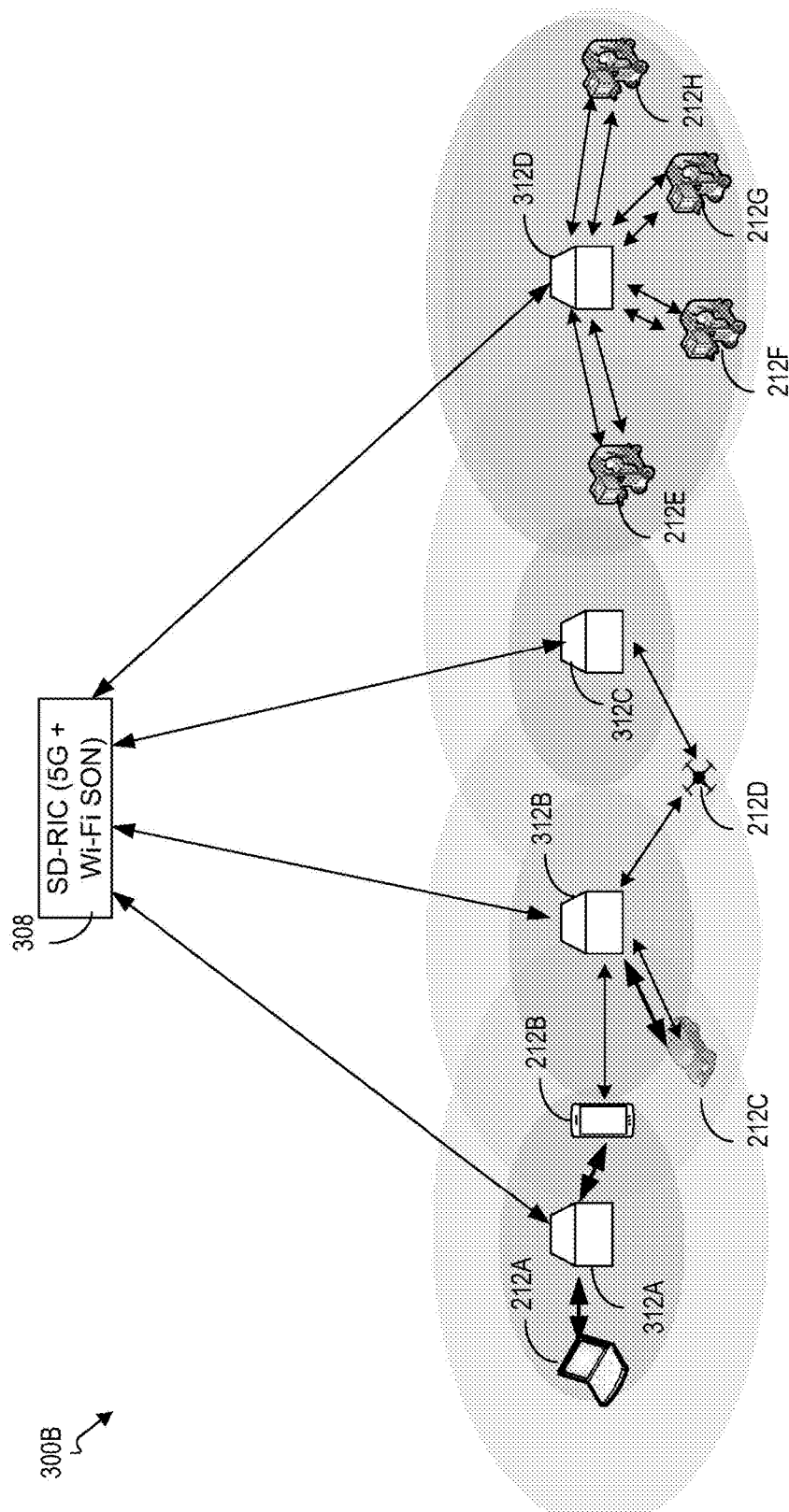
FIG. 3B illustrates an example schematic representation of the SD-RIC controlling dynamic switching between RATs for various Radio Units (RUs), according to an example of the instant disclosure.

FIG. 3B illustrates an example schematic representation of the SD-RIC controlling dynamic switching between RATs for various RUs. In controlling the RUs 312, depending on the UEs 212 (e.g., 212A-212H) that are connected to each respective RU, in the 5G network environment 300B, the SD-RIC 308 may initiate converting a dynamic radio of a particular RU to another protocol, such as from Wi-Fi to 5G or vice versa. As discussed below, with respect to FIG. 4, each RU may include a static radio and a dynamic radio, and the dynamic radio may convert between different RAT protocols. For example, RU 312A is connected to a first UE 212A, a laptop, and a second UE 212B, a cell phone, both of which covered by a dynamic high BW link and if they move further away from the RU 312A they may still be covered by a NR sub6 Anchor coverage link, which is static. It is conceivable that if both the first UE 212A and the second UE 212B moved outside the high BW link coverage area, that it would be more efficient if the high BW link converted to a coverage link.

To continue the example illustrated in FIG. 3B, the second RU 312B is also connected to the second UE 212B as well, via a NR sub6 Anchor coverage link. A third UE 212C, a smart car, may be connected via both a dynamic high BW link and a NR sub6 Anchor coverage link. A fourth UE 212D, a drone, may be connected to the second RU 312B and a third RU 312C via overlapping NR sub6 Anchor coverage links. Lastly, fifth, sixth, seventh, and eight UEs, smart machinery, 212E-212H, may be covered by overlapping NR sub6 Anchor coverage links of a same fourth RU 312D, whereby the dynamic radio is serving as a NR sub6 Anchor coverage link, along with the static radio.

Figure 4:
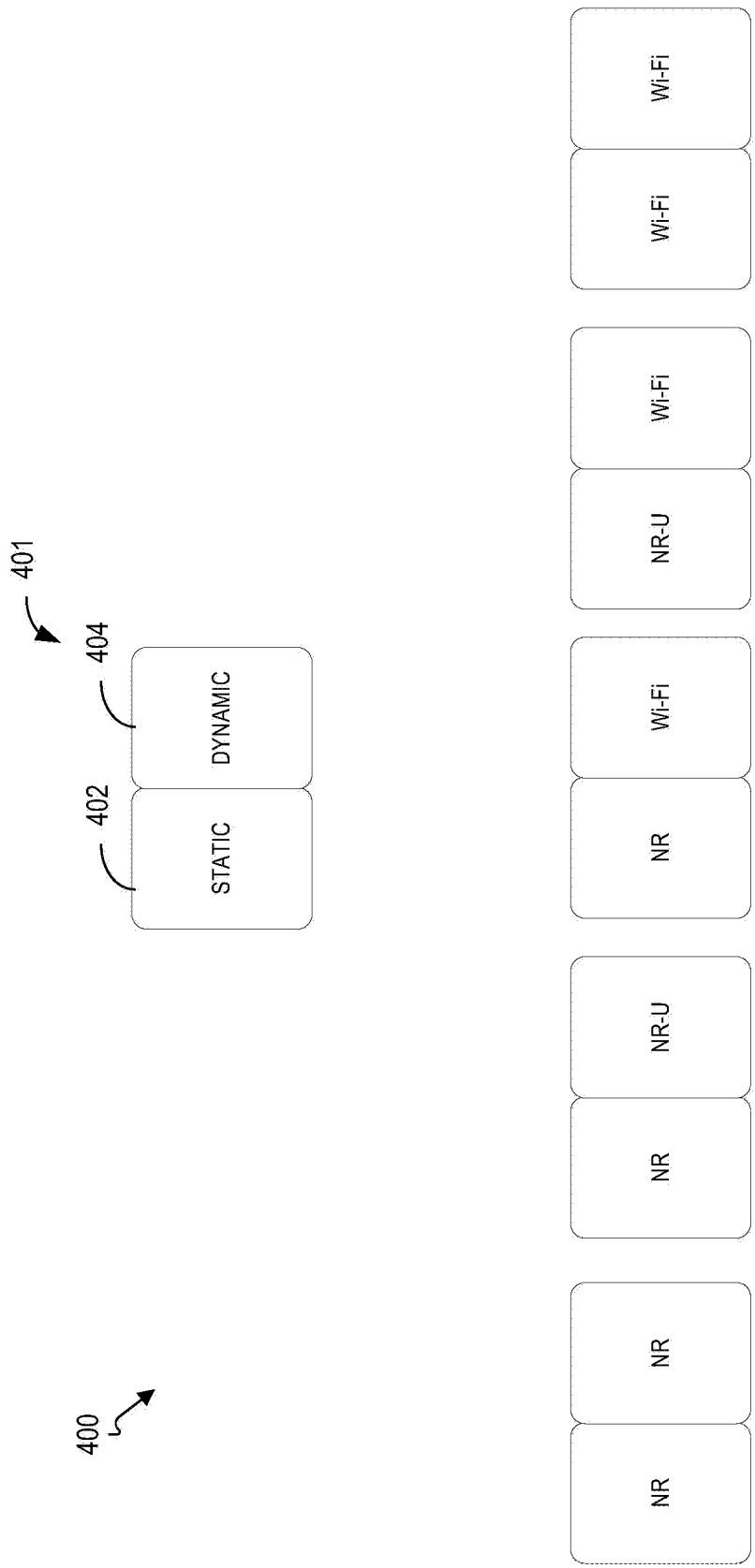
FIG. 4 illustrates a schematic representation of an example RU with multi-protocol personalities, according to an example of the instant disclosure.

FIG. 4 illustrates a schematic representation of an example RU with multi-protocol personalities. In the schematic representation 400, an example RU 401 may be split into a static radio 402 and a dynamic radio 404. The static radio 402 is not changed while the dynamic radio 404 one can be influenced based on the conditions, turning into N-RU or Wi-Fi, for example. The static radio 402 may be configurable at boot-up, retaining network interface (CP, SON, RRM), whereas the dynamic radio 404 may be dynamically configurable, and providing 5G supplemental carriers or Wi-Fi on demand. The intelligence is built around the SD-RIC logical entity. Based on whether the dynamic radio 404 is acting as a Wi-Fi or 5G, the dynamic radio 404 may be connected to the WLC 304, in the case of Wi-Fi, or the 5G packet core 306, in the case of 5G. Also, a sub 6 GHz can be a spine of the anchor for the static radio 402 and the link for the dynamic radio 404 could be either a sub 6 GHz or could be millimeter wave.

As shown in FIG. 4, both the static radio 402 and the dynamic radio 404 may be 5G New Radios (NRs). Specifically, the static radio 402 may be 5G NR while the dynamic radio 404 may be 5G New Radio Unlicensed (NR-U) or Wi-Fi. As another example, the static radio 402 may be 5G NR-U while the dynamic radio is Wi-Fi. Alternatively, both the static radio 402 and the dynamic radio 404 may be Wi-Fi compatible radios. While reference is made to Wi-Fi, otherwise the IEEE 802.11 family of protocols, throughout this disclosure, the technology described herein can be integrated with an applicable RAT.

The static radio 402 may serve as the coverage link that offers a wider range, so as devices move around to roam as they are always connected to that link. However, for the dynamic radio 404, depending on the UE or devices, the choice may be between a high bandwidth link (e.g., 5G) for capacity or a high reliability link (e.g., Wi-Fi) for redundancy. The parameters are collected in the SD-RAN via each of the radios and are used to change the logic.

Such nodes for 5G and Wi-Fi may be utilized whenever the need arises. Each of the radios may support a plurality of carriers, e.g. two carriers. While the static radio 402 may support a plurality of carriers, the static radio 402 selects one at boot-up and does not change it. For the dynamic radio 404, there can be a default carrier that is used in typical, or otherwise normal, operation of a radio. As follows, the other carrier can be a secondary carrier. Whether a carrier is operating as a default carrier or a secondary carrier can be based on operational parameters of the radio, e.g. specific values of the operational parameters. Specifically, a radio can be switched to operate from a default carrier to a second carrier based on one or more specific load conditions. For example, if 5G is being utilized for a dynamic radio, then 5G is kept on, but if it is underutilized, and it is determined that Wi-Fi activity is increasing, there is a need to increase the capacity on the Wi-Fi side. If there is a higher interference and going to cause interference to the neighboring cells, the dynamic radio may be prepped for switching, and actually switch depending on whether the interference and other metrics such as latency or QoS meets a certain duration.

Figure 5A:
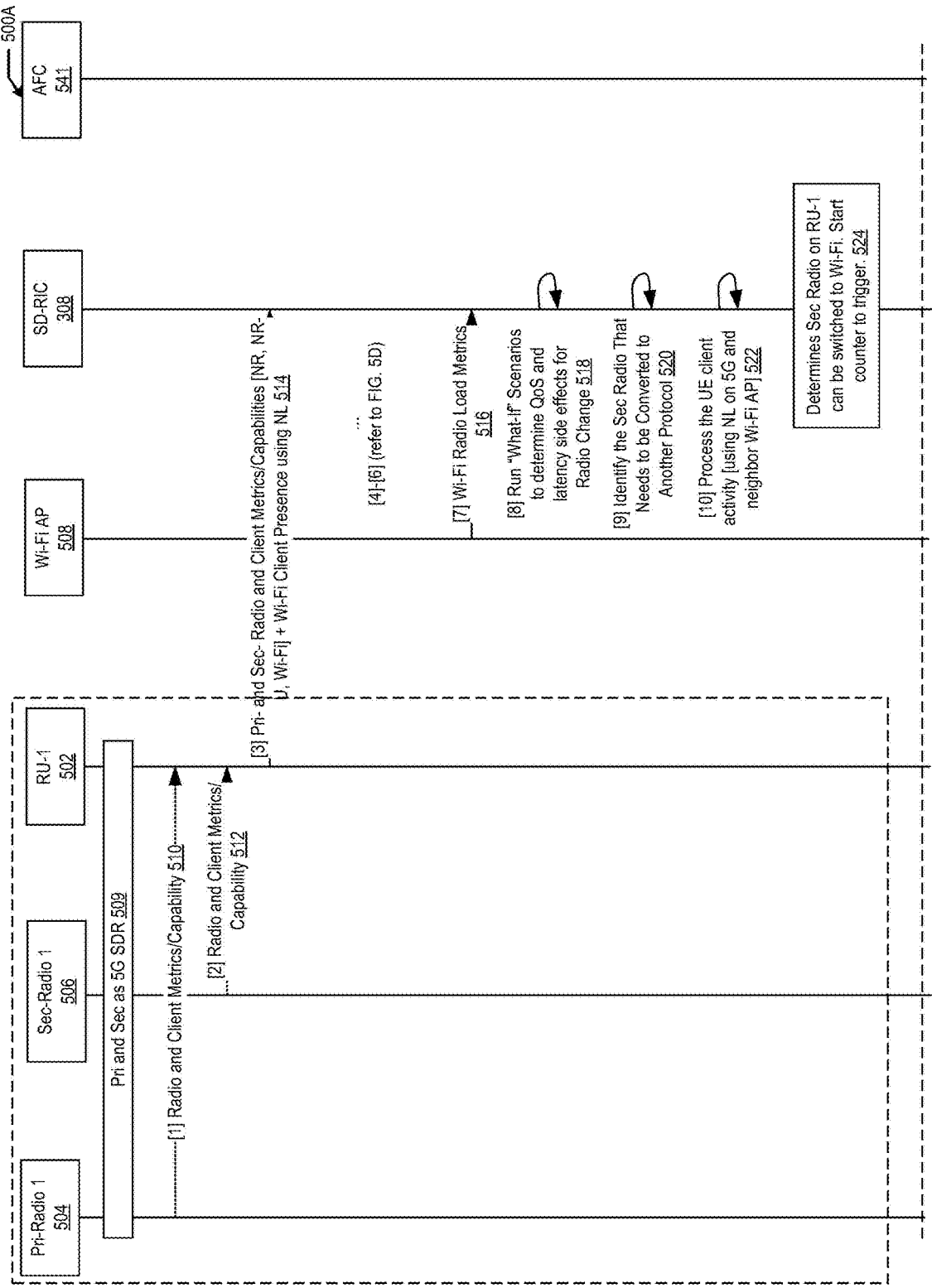
FIG. 5A-5D illustrates an example flow diagram of switching a dynamic radio on a single RU between RAT protocols, in accordance with some aspects of the present disclosure.
Figure 5B:
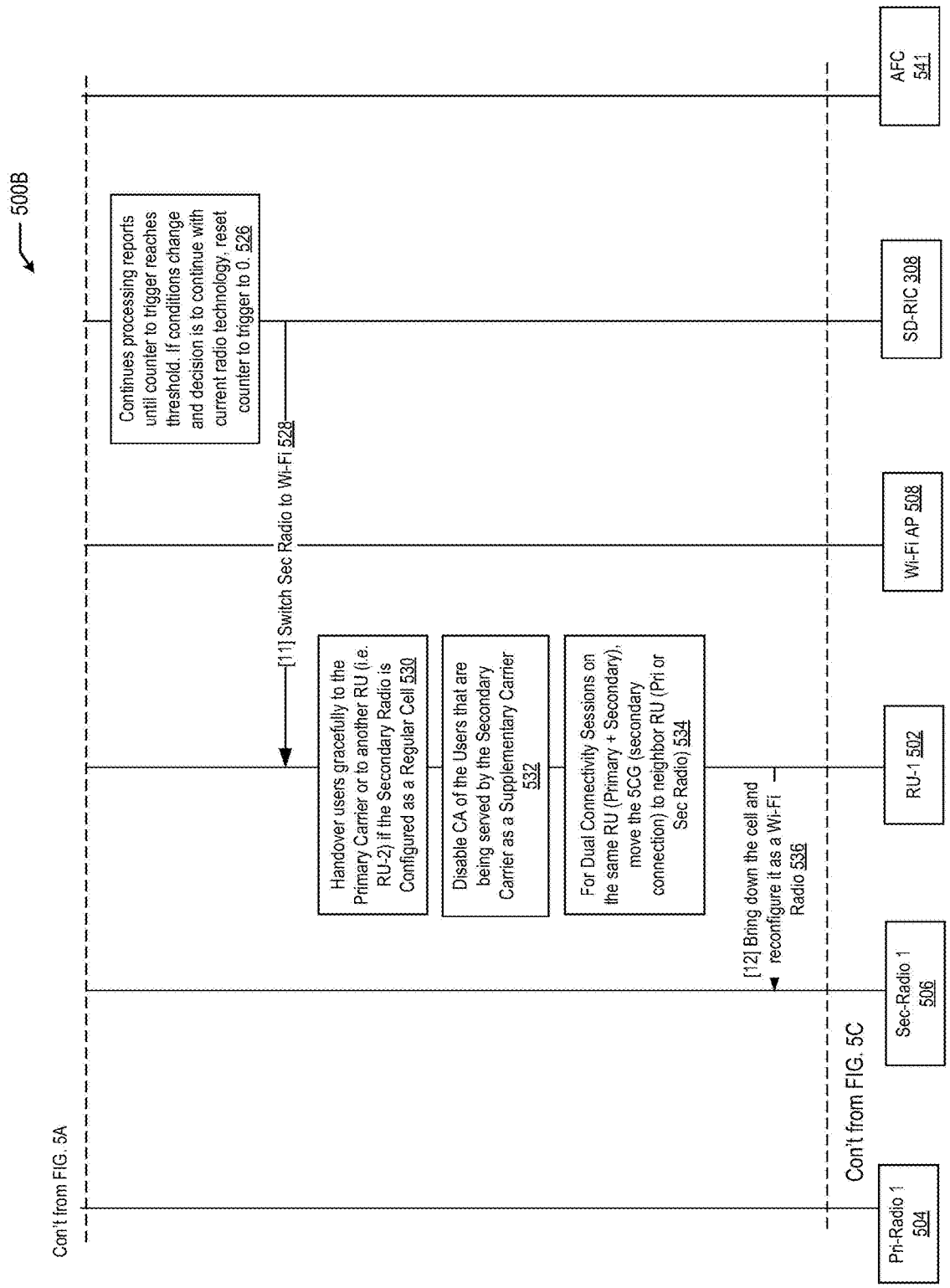
Figure 5C:
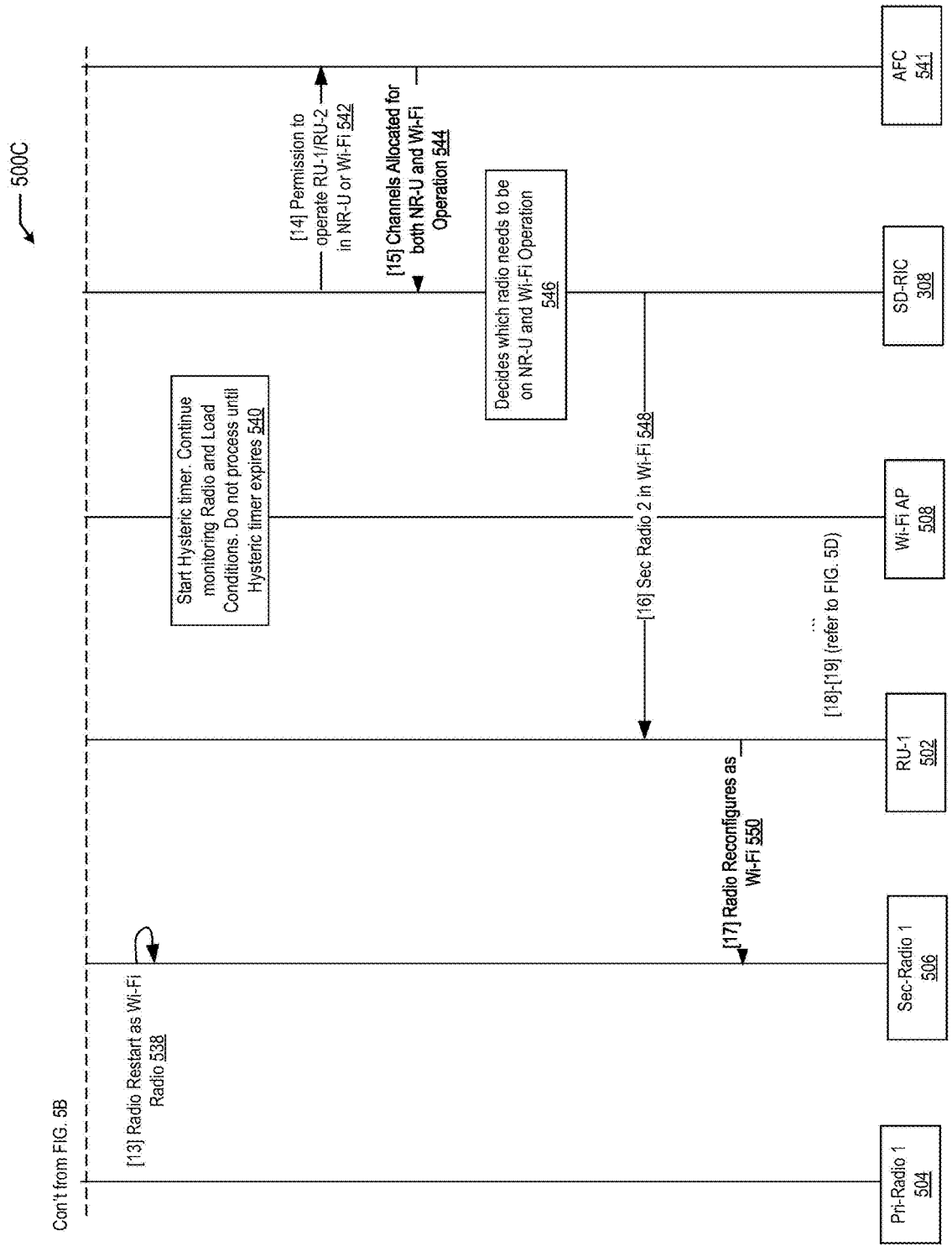
Figure 5D:
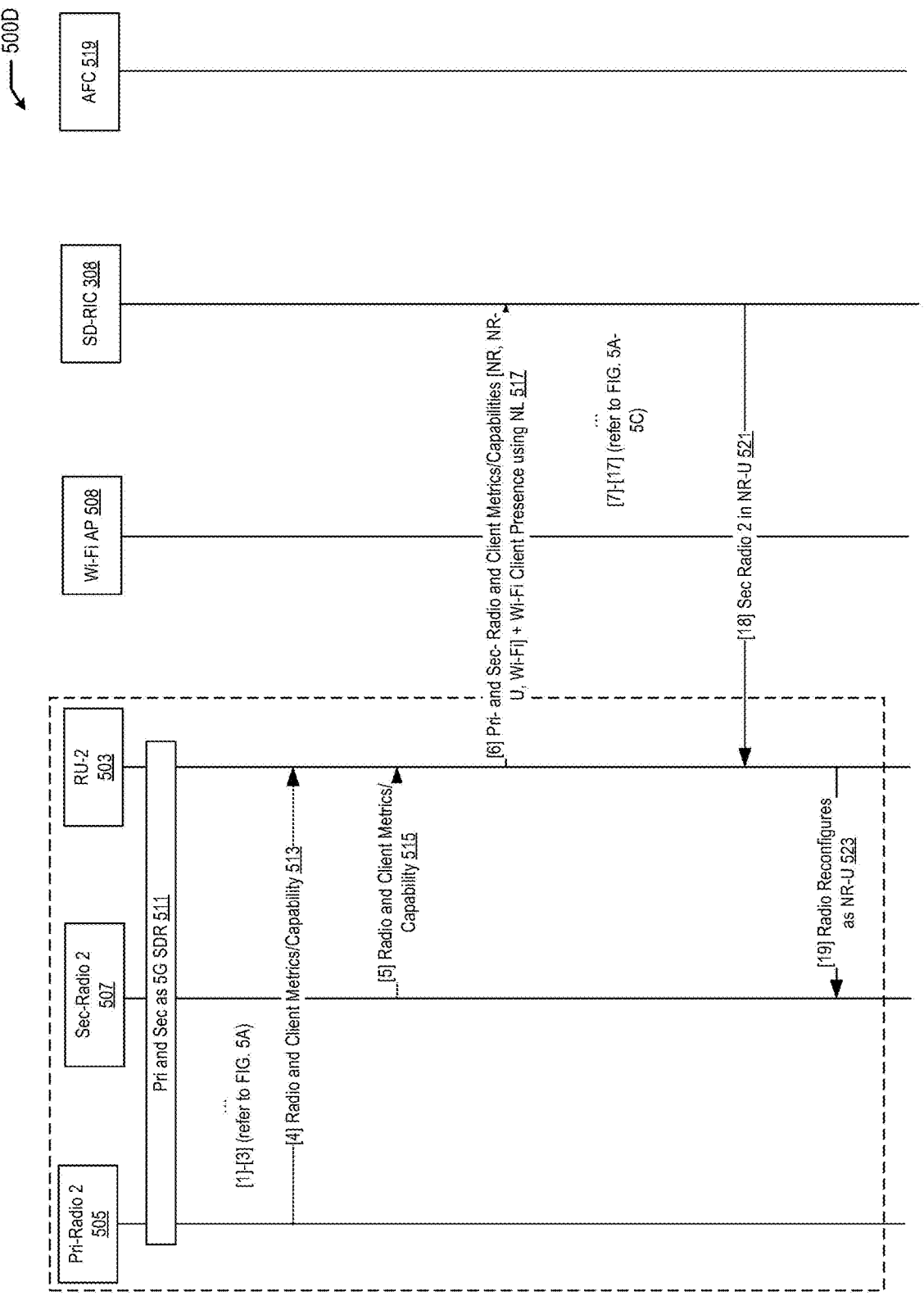

FIGS. 5A-5D illustrates an example flow diagram of switching a dynamic radio on a single RU between RAT protocols. FIGS. 5A-5C illustrates the example flow diagram 500A include a first RU (RU-1) 502 managed by the SD-RIC 308 and FIG. 5D illustrated a second RU (RU-2) 503 also managed by the SD-RIC 308. The RU-1 502 may include a first static radio 504 and a first dynamic radio 506. The first static radio 504 and the first dynamic radio 506 may be initially set as a 5G software-defined radio (SDR) in step 509. The first static radio 504 may internally send radio and client metrics and capabilities to RU-1 502 in step 510 in preparation to be sent externally. The first dynamic radio 506 may also internally send radio and client metrics and capabilities to RU-1 502 in step 512 in preparation to be sent externally. The RU-1 502 may then send the radio and client metrics and capabilities from the static and dynamic radios, as well as Wi-Fi client presence using Network Listen, which listens for activities from neighboring radios, to the SD-RIC 308 in step 514.

The next three steps may be with respect to the second RU (RU-2) 503 that also sends radio and client metrics and capabilities to the SD-RIC 308, as described in more detail below with respect to FIG. 5D illustrating the example flow diagram 500D. The RU-2 503 may include a second static radio 505 and a second dynamic radio 507. The second static radio 505 and the second dynamic radio 507 may be initially set as a 5G software-defined radio (SDR) in step 511. The second static radio 505 may internally send radio and client metrics and capabilities to RU-1 502 in step 513 in preparation to be sent externally. The second dynamic radio 507 may also internally send radio and client metrics and capabilities to RU-2 503 in step 515 in preparation to be sent externally. The RU-2 503 may then send the radio and client metrics and capabilities from the first and secondary radios, as well as Wi-Fi client using NL, to the SD-RIC 308 in step 517.

The Wi-Fi AP 508 may also send Wi-Fi radio load metrics to SD-RIC 308 in step 516. The SD-RIC 308 may then run "what-if" scenarios to determine Quality of Service (QoS) and latency side effects for a potential radio change in step 518. 5G RAN may provide metrics such as active users, physical resource block (PRB) usage, Quality of Service (QoS), connection latency, reliability metrics, neighbor cell coverage, and overlap/interference to the SD-RIC. Network listen functionality of the 5G RAN may also be used to determine the Wi-Fi client activity in the vicinity of each Radio unit. Alternatively, if overlapped Wi-Fi coverage is available, a Wi-Fi AP could also pass utilization metrics to the SD-RIC 308.

Using this information, SD-RIC 308 may determine if any of the secondary cells of the 5G RAN can potentially become a Wi-Fi radio if needed. The SD-RIC 308 may further determine whether the secondary carrier of a particular RU is being utilized or is it being utilized lightly, whether there be a coverage hole if this secondary radio is switched to Wi-Fi, and whether losing a 5G carrier affects the QoS, latency, reliability, and/or throughput needs of any ongoing sessions.

As such, the SD-RIC 308 may then identify that the first dynamic radio 508 needs to cover to another RAT protocol in step 520. The SD-RIC 308 may further process UE client activities using NL on 5G and neighbor Wi-Fi AP 508 in step 522. The SD-RIC 308 may further determine whether there is a need to setup Wi-Fi by determining the UE client activity in the vicinity of the RU with a secondary radio that can be converted to Wi-Fi. The SD-RIC 308 may further determine the load reports from the Wi-Fi APs in the vicinity of the RU with a secondary radio that can be converted to Wi-Fi. Based on the position of the activity or load with respect to a threshold. Based on the kind of activity, the location of the activity, and/or load balancing thresholds, if 5G is still being underutilized on the first dynamic radio 506, SD-RIC 308 will mark the first dynamic radio 506 as a potential candidate for conversion to Wi-Fi and start counting to trigger. The SD-RIC 308 may then determine that the first dynamic radio 506 on RU-1 502 can be switched to Wi-Fi and start a counter to trigger in step 524. Continuing on to FIG. 4B, the SD-RIC 308 may continue to process reports until the counter to trigger reaches a threshold. Continuing on to FIG. 5B illustrating the example flow diagram 500B, if conditions change and the decision is to continue with a current RAT, the counter to trigger is reset to 0, in step 526. If the trigger reaches 9, the SD-RIC 308 issues a command to RU-1 502 to switch the first dynamic radio 506 to Wi-Fi or N-RU.

When the RU-1 502 gets the command, and if there are clients, RU-1 502 does a handover either to primary radio or a neighboring radio in step 530. The RU-1 502 may also disable carrier aggregation (CA) in step 532. During CA, mobile operators combine two or more carriers into single data channel to increase the capacity of the network. If there are dual connectivity sessions on a same RU, the UEs connected to both the first static radio 504 and the first dynamic radio 506 are moved to a secondary cell group (SCG) of a neighbor RU in step 534. Once the RU-1 502 is done performing all the actions and documents, RU-1 502 brings down the cell and reconfigures to what was command as issued by the SD-RIC 308 in step 536.

Continuing on to FIG. 5C illustrating the example flow diagram 500C, the first dynamic radio 506 restarts with as a Wi-Fi radio in step 538. In order to avoid a ping pong effect, once the first dynamic radio 506 starts a new role, it has to be in that state for a specific amount of time to be configured to provide network service access according to the new RAT and provide network service through the new RAT. Therefore, there is a hysteresis mechanism to make sure it continues to be in the newer role for some time, and only after that time has passed does the SD-RIC 308 start processing load reports again to decide whether the dynamic radio needs to go back to the previous role. The hysteric timer may start while the radio and load conditions are monitored, whereby the process does not continue until the hysteric time expires, in step 540.

A Wi-Fi 6 compliant access point can have a dual 2.4 or 6 Ghz radio. Optionally, if a radio frequency needs to be converted to 6 Ghz, permissions needs to be asked from an automated frequency coordination (AFC) system 541. Once the SD-RIC 308 checks and determines a N-RU or Wi-Fi 6 Ghz in a standard path (SP) mode needs for operating, the AFC system 541 may allow it. As such, the SD-RIC 308 may also ask permission from an automated frequency coordination (AFC) system 541 to operate the RU-1 502 or the RU-2 503 in RU-U or Wi-Fi in step 542. The AFC 541 may allocate channels for both NR-U and Wi-Fi operation in step 544. The SD-RIC 308 may decide which radio needs to be operating in NR-U and Wi-Fi in step 546 and then issue a command to the RU-1 502 that the first dynamic radio 506 is to operate in Wi-Fi in step 548. The RU-1 502 may then reconfigure the first dynamic radio 506 to operate in Wi-Fi in step 550. Referring to FIG. 5D, the SD-RIC 308 may also issue a command to RU-2 503 that the second dynamic radio 507 is to operate in NR-U in step 521. The RU-2 503 may then reconfigure the second dynamic radio 507 to operate in NR-U in step 523.

Figure 6:
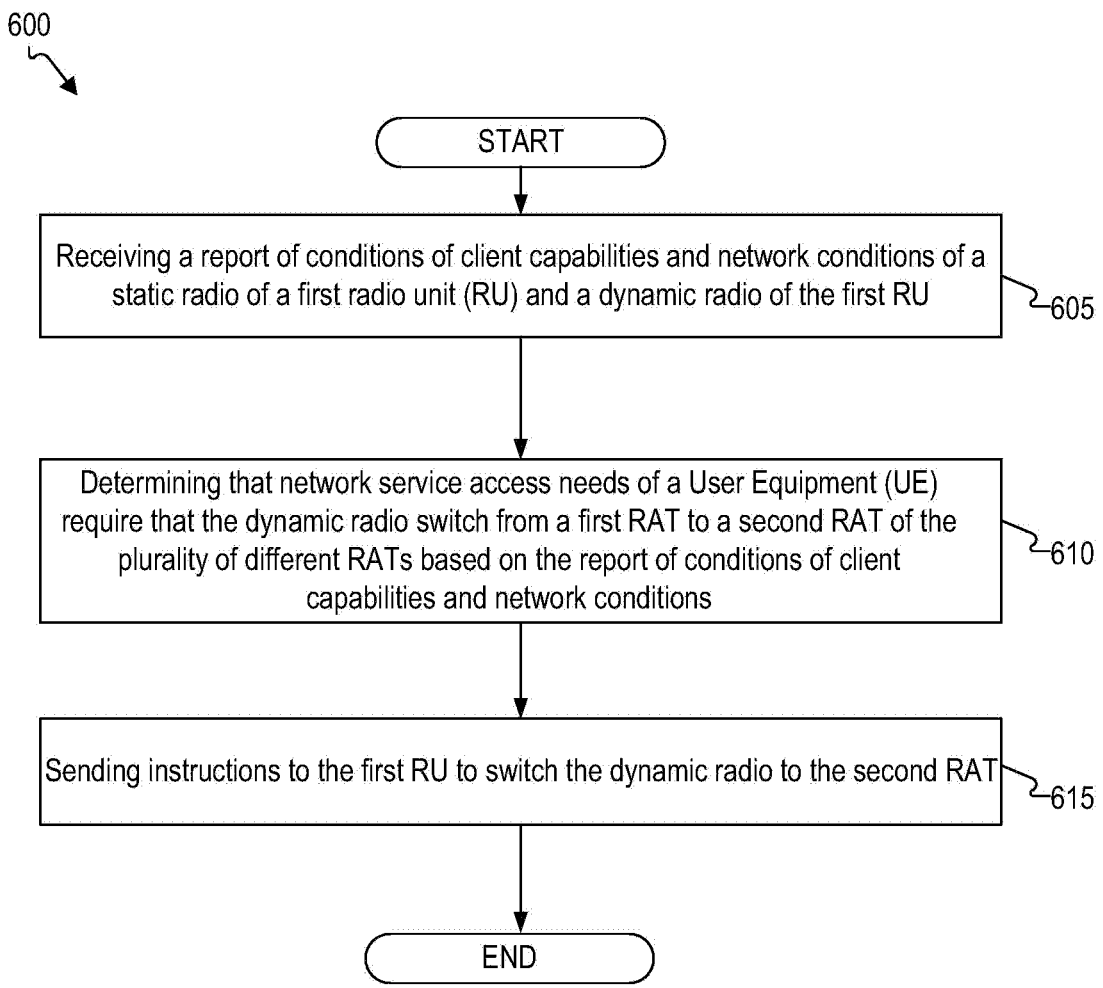
FIG. 6 illustrates an example method for switching a dynamic radio on a single RU between RAT protocols, according to an example of the instant disclosure.
Figure 7:
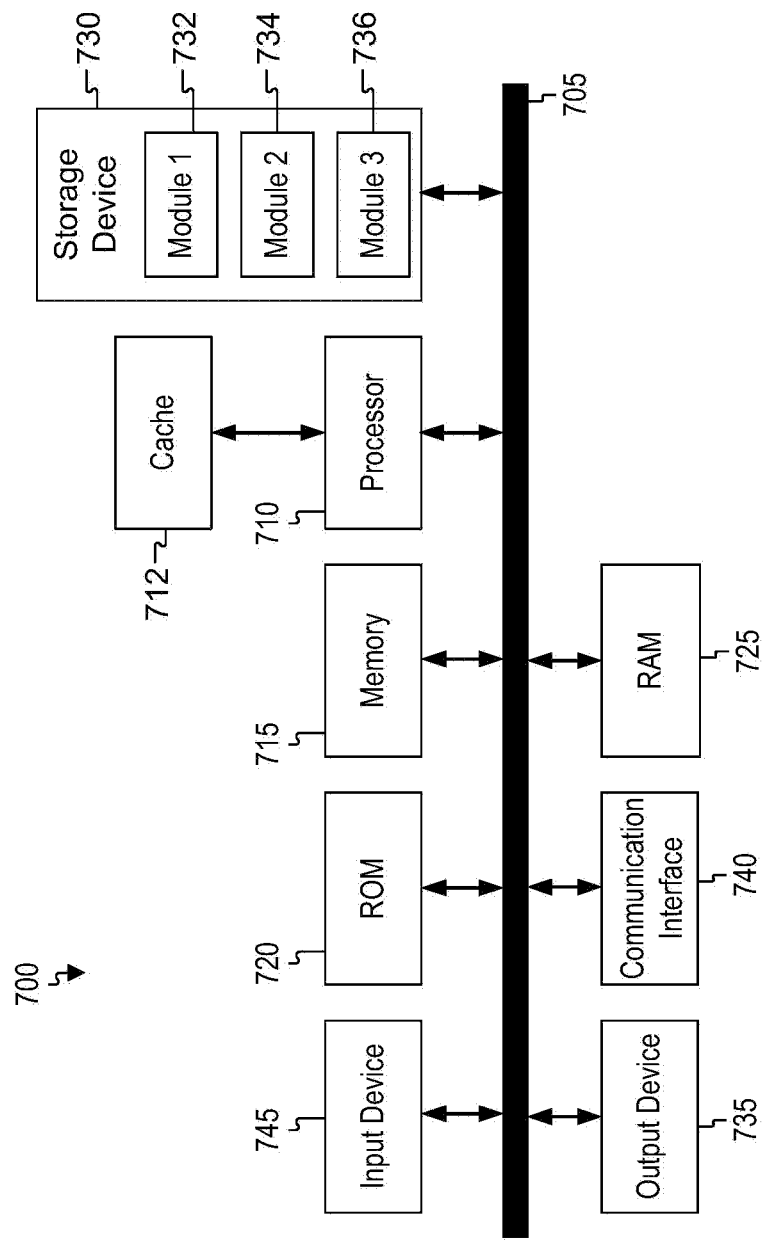
FIG. 7 shows an example of a computing system in accordance with some aspects of the present disclosure.

FIG. 6 illustrates an example method for switching a dynamic radio on a single RU between RAT protocols. Although the example method 600 depicts a particular sequence of operations, the sequence may be altered without departing from the scope of the present disclosure. For example, some of the operations depicted may be performed in parallel or in a different sequence that does not materially affect the function of the method 600. In other examples, different components of an example device or system that implements the method 600 may perform functions at substantially the same time or in a specific sequence.

According to some examples, the method 600 includes receiving a report of conditions of client capabilities and network conditions of a static radio of a first radio unit (RU) and a dynamic radio of the first RU at step 605. For example, the SD-RIC 308 illustrated in FIGS. 3A, 3B, 5A-5D may receive a report of conditions of client capabilities and network conditions of both a static radio of a first radio unit (RU) and a dynamic radio of the first RU. In some examples, the static radio is configured at boot-up and retains a network interface and the dynamic radio is reconfigurable to provide dynamic network service access across a plurality of different RATS.

According to some examples, the method includes determining that network service access needs of a User Equipment (UE) require that the dynamic radio switch from a first RAT to a second RAT of the plurality of different RATs based on the report of conditions of client capabilities and network conditions at step 610. For example, the SD-RIC 308 illustrated in FIGS. 3A, 3B, 5A-5D may determine that network service access needs of a User Equipment (UE) require that the dynamic radio switch from a first RAT to a second RAT of the plurality of different RATs based on the report of conditions of client capabilities and network conditions.

According to some examples, the method includes sending instructions to the first RU to switch the dynamic radio to the second RAT at step 615. For example, the SD-RIC 308 illustrated in FIGS. 3A, 3B, 5A-5D may send instructions to the first RU to switch the dynamic radio to the second RAT. In some examples, a multi-protocol software-defined RAN intelligent controller (SD-RIC) performs the receiving, the determining and the sending. In some examples, the plurality of different RATs includes at least two of 5G New Radio (NR), 5G NR Unlicensed (NR-U), Wi-Fi, or a combination thereof. In some examples, the network service access needs relate to at least one of capacity, reliability, redundancy, or a combination thereof. In some examples, the instructions to switch the dynamic radio includes an indication of frequency bands of operation for the dynamic radio in the second RAT.

According to some examples, the method includes prior to the receiving the conditions, configuring, by a centralized multi-protocol SD-RIC, the static radio to provide network service access through either 5G or Wi-Fi at boot-up. For example, the SD-RIC 308 illustrated in FIGS. 3A, 3B, 5A-5D may prior to the receive the conditions, configure, by a centralized multi-protocol SD-RIC, the static radio to provide network service access through either 5G or Wi-Fi at boot-up.

According to some examples, the method includes running simulated scenarios to determine side effects of changing the dynamic radio. For example, the SD-RIC 308 illustrated in FIGS. 3A, 3B, 5A-5D may run simulated scenarios to determine side effects of change the dynamic radio.

According to some examples, the method includes determining the dynamic radio is able to switch to the different radio technology without side effect issues based on the simulated scenarios. For example, the SD-RIC 308 illustrated in FIGS. 3A, 3B, 5A-5D may determine the dynamic radio is able to switch to the different radio technology without side effect issues based on the simulated scenarios. In some examples, the side effects include one of QoS or latency side effects.

According to some examples, the method includes starting a counter while continuing to receive reports of the conditions of the client capabilities and network conditions. For example, the SD-RIC 308 illustrated in FIGS. 3A, 3B, 5A-5D may start a counter while continue to receive reports of the conditions of the client capabilities and network conditions. In some examples, the counter restarts when the conditions change such that a cu current RAT of the two RATs more closely meets the network service access needs.

According to some examples, the method includes sending the instructions are sent to the first RU based on a position of the counter with respect to a defined threshold. For example, the SD-RIC 308 illustrated in FIGS. 3A, 3B, 5A-5D may send the instructions are sent to the first RU based on a position of the counter with respect to a defined threshold.

According to some examples, the method includes determining there are clients on the dynamic radio. For example, the RU-1 502 or RU-02 503 illustrated in FIG. 5A-5D may determine there are clients on the dynamic radio.

According to some examples, the method includes handing the clients over to a neighboring cell while the dynamic radio switches to the second RAT. For example, the RU-1 502 or RU-02 503 illustrated in FIG. 5A-5D may hand the clients over to a neighboring cell while the dynamic radio switches to the second RAT.

According to some examples, the method includes managing available spectrum space across 5G New Radio Unlicensed (NR-U) and Wi-Fi communication spectrums. For example, the SD-RIC 308 illustrated in FIGS. 3A, 3B, 5A-5D may manage available spectrum space across 5G New Radio Unlicensed (NR-U) and Wi-Fi communication spectrums.

According to some examples, the method includes requesting to an Automatic Frequency Coordination (AFC) system for conversion to a 6 Ghz Wi-Fi frequency band. For example, the SD-RIC 308 illustrated in FIGS. 3A, 3B, 5A-5D may request to an Automatic Frequency Coordination (AFC) system for conversion to a 6 Ghz Wi-Fi frequency band.

According to some examples, the method includes determining a N-RU or a Wi-Fi AP is in a standard path needed for operating in the 6 Ghz Wi-Fi frequency band. For example, the SD-RIC 308 illustrated in FIGS. 3A, 3B, 5A-5D may determine a N-RU or a Wi-Fi AP is in a standard path needed for operate in the 6 Ghz Wi-Fi frequency band.

According to some examples, the method includes selectively distributing the 6 Ghz Wi-Fi frequency band via respective operating channels and protocols to the first RU. For example, the SD-RIC 308 illustrated in FIGS. 3A, 3B, 5A-5D may selectively distribute the 6 Ghz Wi-Fi frequency band via respective operating channels and protocols to the first RU.

FIG. 7 shows an example of a computing system in accordance with some aspects of the present disclosure. FIG. 7 shows an example of computing system 700, which can be for example any computing device making up the core network 230, or any component thereof in which the components of the system are in communication with each other using connection 705. Connection 705 can be a physical connection via a bus, or a direct connection into one or more processors 710, such as in a chipset architecture. Connection 705 can also be a virtual connection, networked connection, or logical connection.

In some embodiments computing system 700 is a distributed system in which the functions described in this disclosure can be distributed within a datacenter, multiple datacenters, a peer network, etc. In some embodiments, one or more of the described system components represents many such components each performing some or all of the function for which the component is described. In some embodiments, the components can be physical or virtual devices.

Example system 700 includes at least one processing unit (CPU or processor) 710 and connection 705 that couples various system components including system memory 715, such as read only memory (ROM) 720 and random access memory (RAM) 725 to one or more processors 710. Computing system 700 can include a cache of high-speed memory 712 connected directly with, in close proximity to, or integrated as part of process one or more processors 710.

One or more processors 710 can include any general purpose processor and a hardware service or software service, such as services 732, 734, and 736 stored in storage device 730, configured to control processor 710 as well as a special-purpose processor where software instructions are incorporated into the actual processor design. One or more processors 710 may essentially be a completely self-contained computing system, containing multiple cores or processors, a bus, memory controller, cache, etc. A multi-core processor may be symmetric or asymmetric.

To enable user interaction, computing system 700 includes an input device 745, which can represent any number of input mechanisms, such as a microphone for speech, a touch-sensitive screen for gesture or graphical input, keyboard, mouse, motion input, speech, etc. Computing system 700 can also include output device 735, which can be one or more of a number of output mechanisms known to those of skill in the art. In some instances, multimodal systems can enable a user to provide multiple types of input/output to communicate with computing system 700. Computing system 700 can include communications interface 740, which can generally govern and manage the user input and system output. There is no restriction on operating on any particular hardware arrangement and therefore the basic features here may easily be substituted for improved hardware or firmware arrangements as they are developed.

Storage device 730 can be a non-volatile memory device and can be a hard disk or other types of computer readable media which can store data that are accessible by a computer, such as magnetic cassettes, flash memory cards, solid state memory devices, digital versatile disks, cartridges, random access memories (RAMs), read only memory (ROM), and/or some combination of these devices.

The storage device 730 can include software services, servers, services, etc., that when the code that defines such software is executed by the one or more processors 710, it causes the system to perform a function. In some embodiments, a hardware service that performs a particular function can include the software component stored in a computer-readable medium in connection with the necessary hardware components, such as processor 710, connection 705, output device 735, etc., to carry out the function.

For clarity of explanation, in some instances the present technology may be presented as including individual functional blocks including functional blocks comprising devices, device components, steps or routines in a method embodied in software, or combinations of hardware and software.

Any of the steps, operations, functions, or processes described herein may be performed or implemented by a combination of hardware and software services or services, alone or in combination with other devices. In some embodiments, a service can be software that resides in memory of a client device and/or one or more servers of a content management system and perform one or more functions when a processor executes the software associated with the service. In some embodiments, a service is a program, or a collection of programs that carry out a specific function. In some embodiments, a service can be considered a server. The memory can be a non-transitory computer-readable medium.

In some embodiments the computer-readable storage devices, mediums, and memories can include a cable or wireless signal containing a bit stream and the like. However, when mentioned, non-transitory computer-readable storage media expressly exclude media such as energy, carrier signals, electromagnetic waves, and signals per se.

Methods according to the above-described examples can be implemented using computer-executable instructions that are stored or otherwise available from computer readable media. Such instructions can comprise, for example, instructions and data which cause or otherwise configure a general purpose computer, special purpose computer, or special purpose processing device to perform a certain function or group of functions. Portions of computer resources used can be accessible over a network. The computer executable instructions may be, for example, binaries, intermediate format instructions such as assembly language, firmware, or source code. Examples of computer-readable media that may be used to store instructions, information used, and/or information created during methods according to described examples include magnetic or optical disks, solid state memory devices, flash memory, USB devices provided with non-volatile memory, networked storage devices, and so on.

Devices implementing methods according to these disclosures can comprise hardware, firmware and/or software, and can take any of a variety of form factors. Typical examples of such form factors include servers, laptops, smart phones, small form factor personal computers, personal digital assistants, and so on. Functionality described herein also can be embodied in peripherals or add-in cards. Such functionality can also be implemented on a circuit board among different chips or different processes executing in a single device, by way of further example.

The instructions, media for conveying such instructions, computing resources for executing them, and other structures for supporting such computing resources are means for providing the functions described in these disclosures.

Although a variety of examples and other information was used to explain aspects within the scope of the appended claims, no limitation of the claims should be implied based on particular features or arrangements in such examples, as one of ordinary skill would be able to use these examples to derive a wide variety of implementations. Further and although some subject matter may have been described in language specific to examples of structural features and/or method steps, it is to be understood that the subject matter defined in the appended claims is not necessarily limited to these described features or acts. For example, such functionality can be distributed differently or performed in components other than those identified herein. Rather, the described features and steps are disclosed as examples of components of systems and methods within the scope of the appended claims.

Claim language reciting "at least one of" refers to at least one of a set and indicates that one member of the set or multiple members of the set satisfy the claim. For example, claim language reciting "at least one of A and B" means A, B, or A and B.

Illustrative Examples of the Disclosure Include

Aspect 1: A computer-implemented method comprising: receiving a report of conditions of client capabilities and network conditions of a static radio of a first radio unit (RU) and a dynamic radio of the first RU, wherein the static radio is configured at boot-up and retains a network interface and the dynamic radio is reconfigurable to provide dynamic network service access across a plurality of different Radio Access Technologies (RATS); determining that network service access needs of a User Equipment (UE) require that the dynamic radio switch from a first RAT to a second RAT of the plurality of different RATs based on the report of conditions of client capabilities and network conditions; and sending instructions to the first RU to switch the dynamic radio to the second RAT.

Aspect 2: The computer-implemented method of Aspect 1, wherein a multi-protocol software-defined RAN intelligent controller (SD-RIC) performs the receiving, the determining and the sending.

Aspect 3: The computer-implemented method of any of Aspects 1 to 2, further comprising: prior to the receiving the conditions, configuring, by a centralized multi-protocol SD-RIC, the static radio to provide network service access through either 5G or Wi-Fi at boot-up.

Aspect 4: The computer-implemented method of any of Aspects 1 to 3, further comprising: running simulated scenarios to determine side effects of changing the dynamic radio; and determining the dynamic radio is able to switch to the different radio technology without side effect issues based on the simulated scenarios.

Aspect 5: The computer-implemented method of any of Aspects 1 to 4, wherein the side effects include one of QoS or latency side effects.

Aspect 6: The computer-implemented method of any of Aspects 1 to 5, wherein the plurality of different RATs include at least two of 5G New Radio (NR), 5G NR Unlicensed (NR-U), Wi-Fi, or a combination thereof.

Aspect 7: The computer-implemented method of any of Aspects 1 to 6, further comprising: starting a counter while continuing to receive reports of the conditions of the client capabilities and network conditions, wherein the counter restarts when the conditions change such that a current RAT of the two RATs more closely meets the network service access needs; and sending the instructions are sent to the first RU based on a position of the counter with respect to a defined threshold.

Aspect 8: The computer-implemented method of any of Aspects 1 to 7, further comprising: determining there are clients on the dynamic radio; and handing the clients over to a neighboring cell while the dynamic radio switches to the second RAT.

Aspect 9: The computer-implemented method of any of Aspects 1 to 8, wherein the network service access needs relate to at least one of capacity, reliability, redundancy, or a combination thereof.

Aspect 10: The computer-implemented method of any of Aspects 1 to 9, wherein the instructions to switch the dynamic radio includes an indication of frequency bands of operation for the dynamic radio in the second RAT.

Aspect 11: The computer-implemented method of any of Aspects 1 to 10, further comprising: managing available spectrum space across 5G New Radio Unlicensed (NR-U) and Wi-Fi communication spectrums; requesting to an Automatic Frequency Coordination (AFC) system for conversion to a 6 Ghz Wi-Fi frequency band; determining a N-RU or a Wi-Fi AP is in a standard path needed for operating in the 6 Ghz Wi-Fi frequency band; and selectively distributing the 6 Ghz Wi-Fi frequency band via respective operating channels and protocols to the first RU.

Aspect 12: A system for switching a dynamic radio on a single RU between RAT protocols, comprising: a storage configured to store instructions; a processor configured to execute the instructions and cause the processor to: receive a report of conditions of client capabilities and network conditions of a static radio of a first radio unit (RU) and a dynamic radio of the first RU, wherein the static radio is configured at boot-up and retains a network interface and the dynamic radio is reconfigurable to provide dynamic network service access across a plurality of different Radio Access Technologies (RATS), determine that network service access needs of a User Equipment (UE) require that the dynamic radio switch from a first RAT to a second RAT of the plurality of different RATs based on the report of conditions of client capabilities and network conditions, and send instructions to the first RU to switch the dynamic radio to the second RAT.

Aspect 13: The system of Aspect 12, wherein a multi-protocol software-defined RAN intelligent controller (SD-RIC) performs the receiving, the determining and the sending.

Aspect 14: The system of any of Aspects 12 to 13, wherein the processor is configured to execute the instructions and cause the processor to: prior to the receive the conditions, configure, by a centralized multi-protocol SD-RIC, the static radio to provide network service access through either 5G or Wi-Fi at boot-up.

Aspect 15: The system of any of Aspects 12 to 14, wherein the processor is configured to execute the instructions and cause the processor to: run simulated scenarios to determine side effects of change the dynamic radio; and determine the dynamic radio is able to switch to the different radio technology without side effect issues based on the simulated scenarios.

Aspect 16: The system of any of Aspects 12 to 15, wherein the side effects include one of QoS or latency side effects.

Aspect 17: The system of any of Aspects 12 to 16, wherein the plurality of different RATs include at least two of 5G New Radio (NR), 5G NR Unlicensed (NR-U), Wi-Fi, or a combination thereof.

Aspect 18: The system of any of Aspects 12 to 17, wherein the processor is configured to execute the instructions and cause the processor to: start a counter while continue to receive reports of the conditions of the client capabilities and network conditions, wherein the counter restarts when the conditions change such that a current RAT of the two RATs more closely meets the network service access needs; and send the instructions are sent to the first RU based on a position of the counter with respect to a defined threshold.

Aspect 19: The system of any of Aspects 12 to 18, wherein the processor is configured to execute the instructions and cause the processor to: determine there are clients on the dynamic radio; and hand the clients over to a neighboring cell while the dynamic radio switches to the second RAT.

Aspect 20: The system of any of Aspects 12 to 19, wherein the network service access needs relate to at least one of capacity, reliability, redundancy, or a combination thereof.

Aspect 21: The system of any of Aspects 12 to 20, wherein the instructions to switch the dynamic radio includes an indication of frequency bands of operation for the dynamic radio in the second RAT.

Aspect 22: The system of any of Aspects 12 to 21, wherein the processor is configured to execute the instructions and cause the processor to: manage available spectrum space across 5G New Radio Unlicensed (NR-U) and Wi-Fi communication spectrums; request to an Automatic Frequency Coordination (AFC) system for conversion to a 6 Ghz Wi-Fi frequency band; determine a N-RU or a Wi-Fi AP is in a standard path needed for operate in the 6 Ghz Wi-Fi frequency band; and selectively distribute the 6 Ghz Wi-Fi frequency band via respective operating channels and protocols to the first RU.

Aspect 23: A non-transitory computer readable medium comprising instructions, the instructions, when executed by a computing system, cause the computing system to: receive a report of conditions of client capabilities and network conditions of a static radio of a first radio unit (RU) and a dynamic radio of the first RU, wherein the static radio is configured at boot-up and retains a network interface and the dynamic radio is reconfigurable to provide dynamic network service access across a plurality of different Radio Access Technologies (RATS); determine that network service access needs of a User Equipment (UE) require that the dynamic radio switch from a first RAT to a second RAT of the plurality of different RATs based on the report of conditions of client capabilities and network conditions; and send instructions to the first RU to switch the dynamic radio to the second RAT.

Aspect 24: The computer readable medium of Aspect 23, a multi-protocol software-defined RAN intelligent controller (SD-RIC) performs the receiving, the determining and the sending.

Aspect 25: The computer readable medium of any of Aspects 23 to 24, wherein the computer readable medium further comprises instructions that, when executed by the computing system, cause the computing system to: prior to the receive the conditions, configure, by a centralized multi-protocol SD-RIC, the static radio to provide network service access through either 5G or Wi-Fi at boot-up.

Aspect 26: The computer readable medium of any of Aspects 23 to 25, wherein the computer readable medium further comprises instructions that, when executed by the computing system, cause the computing system to: run simulated scenarios to determine side effects of change the dynamic radio; and determine the dynamic radio is able to switch to the different radio technology without side effect issues based on the simulated scenarios.

Aspect 27: The computer readable medium of any of Aspects 23 to 26, the side effects include one of QoS or latency side effects.

Aspect 28: The computer readable medium of any of Aspects 23 to 27, the plurality of different RATs include at least two of 5G New Radio (NR), 5G NR Unlicensed (NR-U), Wi-Fi, or a combination thereof.

Aspect 29: The computer readable medium of any of Aspects 23 to 28, wherein the computer readable medium further comprises instructions that, when executed by the computing system, cause the computing system to: start a counter while continue to receive reports of the conditions of the client capabilities and network conditions, wherein the counter restarts when the conditions change such that a current RAT of the two RATs more closely meets the network service access needs; and send the instructions are sent to the first RU based on a position of the counter with respect to a defined threshold.

Aspect 30: The computer readable medium of any of Aspects 23 to 29, wherein the computer readable medium further comprises instructions that, when executed by the computing system, cause the computing system to: determine there are clients on the dynamic radio; and hand the clients over to a neighboring cell while the dynamic radio switches to the second RAT.

Aspect 31: The computer readable medium of any of Aspects 23 to 30, the network service access needs relate to at least one of capacity, reliability, redundancy, or a combination thereof.

Aspect 32: The computer readable medium of any of Aspects 23 to 31, the instructions to switch the dynamic radio includes an indication of frequency bands of operation for the dynamic radio in the second RAT.

Aspect 33: The computer readable medium of any of Aspects 23 to 32, wherein the computer readable medium further comprises instructions that, when executed by the computing system, cause the computing system to: manage available spectrum space across 5G New Radio Unlicensed (NR-U) and Wi-Fi communication spectrums; request to an Automatic Frequency Coordination (AFC) system for conversion to a 6 Ghz Wi-Fi frequency band; determine a N-RU or a Wi-Fi AP is in a standard path needed for operate in the 6 Ghz Wi-Fi frequency band; and selectively distribute the 6 Ghz Wi-Fi frequency band via respective operating channels and protocols to the first RU.

What is claimed is:

1. A computer-implemented method comprising:
   receiving a report of conditions of a static radio of a first radio unit (RU) and a dynamic radio of the first RU, wherein the static radio is configured at boot-up and retains a network interface and the dynamic radio is reconfigurable to provide dynamic network service access across a plurality of different Radio Access Technologies (RATS);
   determining that network service access needs of a User Equipment (UE) require that the dynamic radio switch from a first RAT to a second RAT of the plurality of different RATs based on the report of conditions;
   sending instructions to the first RU to switch the dynamic radio to the second RAT; and
   prior to the receiving the conditions, configuring, by a centralized multi-protocol software-defined RAN intelligent controller (SD-RIC), the static radio to provide network service access through either 5G or Wi-Fi at boot-up.

2. The computer-implemented method of claim 1, wherein the SD-RIC performs the receiving, the determining and the sending.

3. The computer-implemented method of claim 1, further comprising:
   running simulated scenarios to determine side effects of changing the dynamic radio; and
   determining the dynamic radio is able to switch to a different radio technology without side effect issues based on the simulated scenarios.

4. The computer-implemented method of claim 3, wherein the side effects include one of QoS or latency side effects.

5. The computer-implemented method of claim 1, wherein the plurality of different RATs include at least two of 5G New Radio (NR), 5G NR Unlicensed (NR-U), Wi-Fi, or a combination thereof.

6. The computer-implemented method of claim 1, further comprising:
   starting a counter while continuing to receive reports of the conditions of the client capabilities and network conditions, wherein the counter restarts when the conditions change such that a current RAT of the two RATs more closely meets the network service access needs; and
   sending the instructions are sent to the first RU based on a position of the counter with respect to a defined threshold.

7. The computer-implemented method of claim 1, further comprising:
   determining there are clients on the dynamic radio; and
   handing the clients over to a neighboring cell while the dynamic radio switches to the second RAT.

8. The computer-implemented method of claim 1, wherein the network service access needs relate to at least one of capacity, reliability, redundancy, or a combination thereof.

9. The computer-implemented method of claim 1, wherein the instructions to switch the dynamic radio includes an indication of frequency bands of operation for the dynamic radio in the second RAT.

10. The computer-implemented method of claim 1, further comprising:
    managing available spectrum space across 5G New Radio Unlicensed (NR-U) and Wi-Fi communication spectrums;
    requesting to an Automatic Frequency Coordination (AFC) system for conversion to a 6 Ghz Wi-Fi frequency band;
    determining a N-RU or a Wi-Fi AP is in a standard path needed for operating in the 6 Ghz Wi-Fi frequency band; and
    selectively distributing the 6 Ghz Wi-Fi frequency band via respective operating channels and protocols to the first RU.

11. A system for switching a dynamic radio on a single RU between RAT protocols, comprising:
    a storage configured to store instructions;
    a processor configured to execute the instructions and cause the processor to:

receive a report of conditions of client capabilities and network conditions of a static radio of a first radio unit (RU) and a dynamic radio of the first RU, wherein the static radio is configured at boot-up and retains a network interface and the dynamic radio is reconfigurable to provide dynamic network service access across a plurality of different Radio Access Technologies (RATS), determine that network service access needs of a User Equipment (UE) require that the dynamic radio switch from a first RAT to a second RAT of the plurality of different RATs based on the report of conditions of client capabilities and network conditions, send instructions to the first RU to switch the dynamic radio to the second RAT; and prior to the receiving the conditions, configure, by a centralized multi-protocol software-defined RAN intelligent controller (SD-RIC), the static radio to provide network service access through either 5G or Wi-Fi at boot-up.

12. The system of claim 11, wherein the SD-RIC performs the receiving, the determining and the sending.

13. The system of claim 11, wherein the processor is configured to execute the instructions and cause the processor to:

run simulated scenarios to determine side effects of change the dynamic radio; and determine the dynamic radio is able to switch to a different radio technology without side effect issues based on the simulated scenarios.

14. The system of claim 11, wherein the processor is configured to execute the instructions and cause the processor to:

manage available spectrum space across 5G New Radio Unlicensed (NR-U) and Wi-Fi communication spectrums;

request to an Automatic Frequency Coordination (AFC) system for conversion to a 6 Ghz Wi-Fi frequency band;

determine a N-RU or a Wi-Fi AP is in a standard path needed for operate in the 6 Ghz Wi-Fi frequency band; and selectively distribute the 6 Ghz Wi-Fi frequency band via respective operating channels and protocols to the first RU.

15. A non-transitory computer readable medium comprising instructions, the instructions, when executed by a computing system, cause the computing system to:

receive a report of conditions of client capabilities and network conditions of a static radio of a first radio unit (RU) and a dynamic radio of the first RU, wherein the static radio is configured at boot-up and retains a network interface and the dynamic radio is reconfigurable to provide dynamic network service access across a plurality of different Radio Access Technologies (RATS);

determine that network service access needs of a User Equipment (UE) require that the dynamic radio switch from a first RAT to a second RAT of the plurality of different RATs based on the report of conditions of client capabilities and network conditions; send instructions to the first RU to switch the dynamic radio to the second RAT; and prior to the receiving the conditions, configure, by a centralized multi-protocol software-defined RAN intelligent controller (SD-RIC) SD RIC, the static radio to provide network service access through either 5G or Wi-Fi at boot-up.

16. The computer readable medium of claim 15, the SD-RIC performs the receiving, the determining and the sending.

17. The computer readable medium of claim 15, wherein the computer readable medium further comprises instructions that, when executed by the computing system, cause the computing system to:

run simulated scenarios to determine side effects of change the dynamic radio; and determine the dynamic radio is able to switch to a different radio technology without side effect issues based on the simulated scenarios.

* * * * *